United States Patent
Honda et al.

(10) Patent No.: US 7,698,013 B2
(45) Date of Patent: Apr. 13, 2010

(54) PARTS PRODUCTION MANAGEMENT SYSTEM AND PARTS PRODUCTION MANAGEMENT METHOD

(75) Inventors: Hajime Honda, Kikuchi-gun (JP); Yoshiro Yamagami, Fukuoka (JP); Seitaro Ikeda, Tokyo (JP)

(73) Assignees: Honda Motor Co., Ltd., Tokyo (JP); NEC Corporation, Tokyo (JP)

( * ) Notice: Subject to any disclaimer, the term of this patent is extended or adjusted under 35 U.S.C. 154(b) by 258 days.

(21) Appl. No.: 11/878,536

(22) Filed: Jul. 25, 2007

(65) Prior Publication Data

US 2008/0027578 A1 Jan. 31, 2008

(30) Foreign Application Priority Data

Jul. 27, 2006 (JP) ............................. 2006-205061

(51) Int. Cl.
G06F 19/00 (2006.01)

(52) U.S. Cl. ........................... 700/116; 700/226; 705/29

(58) Field of Classification Search ................. 700/115, 700/116, 226; 705/10, 29; 707/1, 4, 102, 707/202

See application file for complete search history.

(56) References Cited

U.S. PATENT DOCUMENTS

| 4,924,385 | A | | 5/1990 | Dote | |
|---|---|---|---|---|---|
| 6,092,001 | A | * | 7/2000 | Mizuno et al. | 700/116 |
| 7,249,044 | B2 | * | 7/2007 | Kumar et al. | 705/8 |
| 2002/0007361 | A1 | * | 1/2002 | Esaki et al. | 707/4 |
| 2003/0090527 | A1 | * | 5/2003 | Kamino | 345/810 |

FOREIGN PATENT DOCUMENTS

| JP | 57-164364 A | 10/1982 |
|---|---|---|
| JP | 61-226252 A | 10/1986 |
| JP | 7-105283 A | 4/1995 |
| JP | 7-296081 A | 11/1995 |
| JP | 10-43997 A | 2/1998 |
| JP | 2002-297224 A | 10/2002 |
| JP | 2002-341917 A | 11/2002 |
| JP | 2003-271229 A | 9/2003 |
| JP | 2004-227184 A | 8/2004 |
| JP | 2006-4019 A | 1/2006 |
| JP | 2006-268177 A | 10/2006 |

* cited by examiner

*Primary Examiner*—Albert DeCady
*Assistant Examiner*—Douglas S Lee
(74) *Attorney, Agent, or Firm*—Arent Fox LLP

(57) ABSTRACT

A parts production management system includes: a first table in which a line cycle number representing a line cycle that is a process unit for processing a group of parts and a parent lot number of a part input for being processed in a line cycle represented by the line cycle number are stored while being linked together; a second table in which the line cycle number and a child lot number of a part processed in the line cycle represented by the line cycle number are stored while being linked together; and a lot linking unit that stores a line cycle number of a line cycle for processing a parent lot and a parent lot number in the first table while being linked together when the parent lot is input to a production line and stores a line cycle number of a line cycle that has processed a child lot and the child lot number while being linked together when a process in the production line is completed and the child lot is output from the production line.

9 Claims, 18 Drawing Sheets

FIG. 4

"LOCATION" − "LOCATION TAG" TABLE

| LOCATION TAG ID | |
|---|---|
| LOCATION CODE | ⟵ 20 |

FIG. 5

"LINE" − "LOCATION" TABLE

| LINE CODE | |
|---|---|
| INPUT PORT LOCATION CODE | ⟵ 21 |
| OUTPUT PORT LOCATION CODE | |
| NUMBER OF TYPES OF INPUT PARTS | |

FIG. 6

LINE CYCLE TABLE

| LINE CYCLE NUMBER | |
|---|---|
| LINE CODE | ⟵ 22 |
| LINE CYCLE START DATE/TIME | |
| LINE CYCLE END DATA/TIME | |
| TOTAL NUMBER OF INPUT PARTS | |
| TOTAL NUMBER OF NON-DEFECTIVE PARTS | |
| TOTAL NUMBER OF DEFECTIVE PARTS | |

FIG. 7

"LOT" − "TROLLEY" − "PART" TABLE

| LOT NUMBER | |
|---|---|
| TROLLEY CODE | ⟵ 23 |
| PART NUMBER | |

FIG. 8A

"LINE CYCLE" – "PROCESSING
LINE INPUT PORT" TABLE

| |
|---|
| LINE CYCLE NUMBER |
| ORDER SLIP NUMBER |
| INPUT COMPLETION IDENTIFIER |

"LINE CYCLE" – "ASSEMBLY
LINE INPUT PORT" TABLE

| |
|---|
| LINE CYCLE NUMBER |
| INPUT LOT NUMBER |
| INPUT COMPLETION IDENTIFIER |

"LINE CYCLE" – "LINE OUTPUT PORT" TABLE

| |
|---|
| LINE CYCLE NUMBER |
| LOADING LOT NUMBER |
| FINAL UPDATE DATE/TIME |

PART LINKING TABLE

| |
|---|
| INPUT PART NUMBER |
| LOADING PART NUMBER |
| LINE CODE |
| FINAL UPDATE DATE/TIME |

TROLLEY FINAL INFORMATION TABLE

| |
|---|
| LOADING CODE |
| LOCATION CODE |
| PART NUMBER |
| LOT NUMBER |
| TROLLEY ID |
| NUMBER OF CURRENTLY LOADED PARTS |

"PART" – "LOCATION CHANGE HISTORY" TABLE

| CHANGE HISTORY NUMBER |
| --- |
| DATE INFORMATION |
| TROLLEY CODE |
| PART NUMBER |
| LOCATION CODE |
| NUMBER OF NORMAL INPUT PARTS |
| NUMBER OF INVENTORY INPUT PARTS |
| NUMBER OF NORMAL OUTPUT PARTS |
| NUMBER OF INVENTORY OUTPUT PARTS |
| CORRECTION AMOUNT |

SUPPLIER ORDER TABLE

| ORDER SLIP NUMBER |
| --- |
| PART NUMBER |
| NUMBER OF DELIVERED PARTS |
| NUMBER OF CURRENTLY LOADED PARTS |

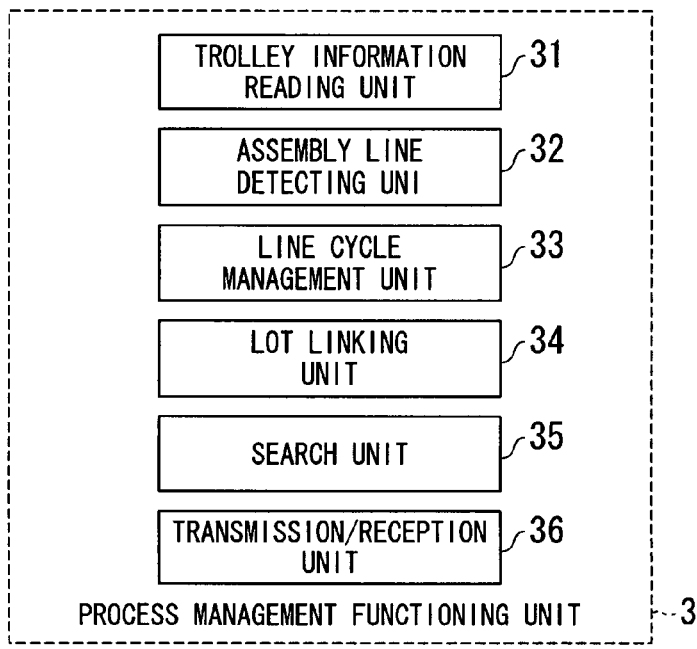

FIG. 26

| LOCATION | PART INFORMATION | | | INVENTORY FIGURES | | NUMBER OF LOADED PARTS | | | | NUMBER OF UNLOADED PARTS | | | | ACCUMULATION | |
|---|---|---|---|---|---|---|---|---|---|---|---|---|---|---|---|
| | TYPE | PART NUMBER | PART NAME | PREVIOUS DAY INVENTORY | CURRENT INVENTORY | NORMAL LOADING | INVENTORY LOADING | EXCEPTIONAL LOADING (NON-DEFECTIVE PART) | EXCEPTIONAL LOADING (DEFECTIVE PART) | NORMAL UNLOADING | INVENTORY UNLOADING | EXCEPTIONAL UNLOADING (NON-DEFECTIVE PART) | EXCEPTIONAL UNLOADING (DEFECTIVE PART) | DEFECTIVE PART (RETEST) | DEFECTIVE PART (RETEST) | CORRECTION AMOUNT |
| PROCESSING LINE INPUT PORT | GAG/GAB | A001 000 0000 00 | MATERIAL L | 0 | 0 | 100 | 0 | 0 | 0 | 100 | 0 | 0 | 0 | 0 | 0 | 0 |
| PROCESSING LINE INPUT PORT | GAG/GAB | B001 000 0000 00 | MATERIAL R | 0 | 0 | 100 | 0 | 0 | 0 | 100 | 0 | 0 | 0 | 0 | 0 | 0 |
| PROCESSING LINE OUTPUT PORT | GAG | A002 000 0000 00 | PROCESSED PART L | 0 | 0 | 100 | 0 | 0 | 0 | 98 | 0 | 0 | 0 | 2 | 32 | 0 |
| PROCESSING LINE OUTPUT PORT | GAG | B002 000 0000 00 | PROCESSED PART R | 0 | 0 | 100 | 0 | 0 | 0 | 97 | 0 | 0 | 0 | 3 | 27 | 0 |
| INTERMEDIATE INVENTORY STORAGE SITE | GAG | A002 000 0000 00 | PROCESSED PART L | 20 | 8 | 0 | 0 | 0 | 0 | 0 | 12 | 0 | 0 | 0 | 0 | 0 |
| INTERMEDIATE INVENTORY STORAGE SITE | GAG | B002 000 0000 00 | PROCESSED PART R | 30 | 17 | 0 | 0 | 0 | 0 | 0 | 13 | 0 | 0 | 0 | 0 | 0 |
| Comp LINE INPUT PORT | GAG | A002 000 0000 00 | PROCESSED PART L | 0 | 0 | 98 | 12 | 0 | 0 | 110 | 0 | 0 | 0 | 0 | 0 | 0 |
| Comp LINE INPUT PORT | GAG | B002 000 0000 00 | PROCESSED PART R | 0 | 0 | 97 | 13 | 0 | 0 | 110 | 0 | 0 | 0 | 0 | 0 | 0 |
| TEST LINE OUTPUT PORT | GAG | C001 000 0000 00 | COMPLETED PART | 0 | 0 | 110 | 0 | 0 | 5 | 100 | 7 | 0 | 0 | 8 | 19 | 0 |
| INVENTORY STORAGE SITE | GAG | C001 000 0000 00 | COMPLETED PART | 15 | 17 | 0 | 7 | 0 | 0 | 0 | 0 | 5 | 5 | 0 | 0 | 0 |
| AE LINE INPUT PORT | GAG | C001 000 0000 00 | COMPLETED PART | 0 | 100 | 100 | 0 | 5 | 0 | 0 | 0 | 0 | 0 | 0 | 0 | 0 |

PARTS PRODUCTION MANAGEMENT SYSTEM AND PARTS PRODUCTION MANAGEMENT METHOD

BACKGROUND OF THE INVENTION

1. Field of the Invention

The present invention relates to a parts production management system capable of linking parts to be processed in a production line in units of a lot and a method thereof.

Priority is claimed on Japanese Patent Application No. 2006-205061, filed Jul. 27, 2006, the content of which is incorporated herein by reference.

2. Description of the Related Art

Quality control methods in which a product and a production process thereof are linked together for management and the production process of a product can be traced retrospectively so as to determine the production process causing a problem by using the linking when there is a defect in the product have been used.

For example, in Japanese Unexamined Patent Application, First Publication No. 10-43997, there is disclosed a system for supporting data analysis of lots of products by creating a table defining the linking relationship between processes when a division event occurs in the processes and linking the lots between the processes using the table.

In Japanese Unexamined Patent Application, First Publication No. 2004-227184, a method of building a quality database and the apparatus the same are disclosed in which, in a packaging process or a point of changing a lot size for a processing operation for products, a configuration of parts are registered as a part tree, a configuration of process flows for management of an engineering process of the registered parts is registered, and registering quality data for management of processing information belonging to the registered processes.

However, in the above-described prior arts, although linking between parent lots and child lots is described, technology of detailed means for the linking process is not described.

In other words, when a linking operation between the parent lots and child lots is performed, a parent lot to be linked is required to be determined when a child lot generated from the parent lot is to be unloaded.

However, since input of the parent lot and loading of the child lot are performed at different locations, there is a problem in that the parent lot to be linked cannot be determined in an easy manner for a production line having no one to one correspondence or a production line through which different types of lots flow concurrently.

SUMMARY OF THE INVENTION

The present invention was made in view of the above circumstances, and an object of the invention is to provide a parts production management system capable of linking between the parent lots and the child lots when the child lot generated from the parent lot is to be unloaded.

A parts production management system that sets a linking relationship between a parent lot number at an input port of a part producing production line and a child lot number at an output port of the production line. The parts production management system includes: a first table (a "line cycle"-"line input port" table) in which a line cycle number representing a line cycle for processing a group of parts and a parent lot number of a part input for being processed in the line cycle represented by the line cycle number are stored while being linked together; a second table (a "line cycle"-"line output port" table) in which the line cycle number and a child lot number of the part processed in the line cycle represented by the line cycle number are stored while being linked together; and a lot linking unit that stores the line cycle number of the line cycle for processing a parent lot and the parent lot number in the first table while being linked together when the parent lot is input to the production line and stores the line cycle number of the line cycle that has processed the child lot and the child lot number while being linked together when a process in the production line is completed and the child lot is output from the production line.

In the parts production management system, since parent lot numbers of parts before processing and the child lot numbers of the parts after processing are corresponded to each other by line cycle numbers of the line cycles processing the group of the parts in a plurality of production lines, linking of a part of the child lot produced from the part of the parent lot can be performed, and by designating the child lot number of a part of which history is required to be known, there is an advantage that the parent lot numbers of parts constructing the part of the child lot can be sequentially checked from a tree structure.

The parts production management system may further include a line cycle management unit that acquires line cycle numbers corresponding to line cycles processing the groups of parts and stores the line cycle numbers, line codes specifying the production lines in which the line cycles corresponding to the line cycle numbers are operated, and start dates of the operations of the line cycles at which the operations of the line cycles are started in a line cycle table while being linked together when the groups of the parts are input to the production lines, that stores an end date of the line cycle at which the line cycle ends and the line cycle number of the line cycle while being linked together when line cycle completion information is input, and that detects the line cycle in which a start date of the line cycle is stored and an end date of the line cycle is not stored as a currently operating line cycle and outputs the line cycle number of the line cycle to the lot linking unit when the lot linking unit links the parent lot to the child lot.

According to the parts production management system of the present invention, by searching the line cycle number of the line cycle for processing a group of parts in the line cycle table, it can be easily detected, based on the line code, that in which of the production lines the line cycle indicated by the line cycle number is currently operated. In addition, history of operating data/time of each line cycle can be easily detected by using the line cycle number. Furthermore, by adding a production condition or the like, the history of transition of production conditions for each group of parts or for each production line can be acquired.

The parts production management system may further include: a third table (a "line"-"location" table) in which a line code representing the production line, an input port location code representing a location of an input port side of the production line, and an output location code representing a location of an output port side of the production line are stored while being linked together; and a production line detecting unit that reads out the line code of the production line corresponding to the input port location code from the third table.

In this case, the production line detecting unit can detect the line code of the production line in an easy manner by operators or sensors disposed in each production line when the input port location code of the production line to which the parts are input is input.

In the parts production management system, the lot linking unit may read out the parent lot number corresponding to the line cycle number from the first table, read out a part number corresponding to the parent lot number as an input part number from a fourth table defining a linking relationship among the lot number, a trolley code representing a trolley loading a lot corresponding to the lot number, and the part number of the lot, refer to a part linking table defining linking between the input part number and a loading part number that is assigned after the input part having the input part number is processed in the production line, read out a loading part number corresponding to the input part number, links the loading part number with the trolley code of the trolley loading the parts, and store the loading part number, a location code representing the current location of the trolley, the lot number of the part, and the number of currently loaded parts representing the number of currently loaded input parts in a trolley current status table.

In this case, since the part numbers of input parts are linked with the part numbers after processing in advance for processed products thereof or assembled parts assembled from a plurality of parts in the part linking table, it is possible to link the part number of the part of the input parent lot to the part number of the part of the child lot in an easy manner. Furthermore, by storing the data in the trolley current status table, management of the part numbers can be performed in an easy manner when the process in the production line of the next stage is performed. In addition, the part numbers of the parent lot and the child lot can be detected in an easy manner when the history is checked.

In the parts production management system, when the lot linking unit links the line cycle number with the child lot, the lot linking unit may read out the number of currently loaded parts corresponding to the loading trolley code from the trolley current status table when the number of loaded parts is input, acquire the child lot number set in correspondence with the line code when the lot linking unit detects that the number of currently loaded parts is "0", and newly store the child lot number in the trolley current status table while being linked with the loading trolley code, and the lot linking unit may read out a loaded part number corresponding to the loading trolley code from the trolley current status table when the lot linking unit detects that the number of currently loaded parts is not "0", compare the loaded part number with the loading part number, update the number of currently loaded parts in the trolley current status table when the loaded part number and the loading part number are identical, and output an error notification when the loaded part number and the loading part number are not identical.

In this case, since the lot number is acquired in units of parts loaded in each trolley, when the number of input parts for the trolley is input by the operator or the like, if the number of currently loaded parts in the loading trolley is "0", it is determined that the input parts are for a new loading process, and accordingly, it is detected whether a new lot number is required to be acquired. On the other hand, if the number of currently loaded parts in the loading trolley is not "0", it is determined that the input parts are for an additional loading process. In addition, when the number of loading part numbers of the loaded parts and the part number of the part to be newly loaded is different, an incorrect loading process can be detected, whereby management of the lot numbers of parts loaded in the trolley can be correctly performed in an easy manner.

In the parts production management system, the line cycle management unit may acquire a part number, newly input to the production line, corresponding to the trolley code from the trolley current status table and detects whether a line cycle corresponding to the line code of the production line is operated, acquire a new line cycle number and sets the new line cycle number as the line cycle number to be linked when the line cycle management unit detects that there is no line cycle corresponding to the part number, read out the parent lot number corresponding to the line cycle number from the first table, reads out the part number corresponding to the lot number from the fourth table, and compares the part number with the part number read from the trolley current table, set the line cycle number as the line cycle number to be linked when the part number are identical and reads out the number of types of parts corresponding to the location code from the third table when the part numbers are not identical, and set the line cycle number as the line cycle number to be linked when the number of types of input parts is not greater than the number of input part numbers, acquires a new line cycle number, and sets the new line cycle number as the line cycle number to be linked when the number of types of input parts is identical to the number of input part numbers.

In this case, the number of types of input parts set as the "line"-"location" table indicates the number of parts required for the process of the line cycle in the production line, and accordingly, when the number of types of the parts is "1", it is indicated that the production line represented by the line code is a processing line for processing one part to be output as one processed part. On the other hand, when the number of types of the parts is two or more, it is indicated that the production line represented by the line code is an assembly line for assembling one assembled product from a plurality of parts. Furthermore, by comparing the number of types of the parts with the number of input part numbers, it is possible to detect whether all the parts required for starting the line cycle are supplied in an easy manner. In addition, by detecting the start of the line cycle, a line cycle number acquiring process can be easily performed in accordance with the start of the line cycle.

A method of managing parts production according to the present invention is used in a parts production management system that sets a linking relationship between a parent lot number at an input port of a part producing production line and a child lot number at an output port of the production line. The method includes: storing a line cycle number of a line cycle processing a parent lot and the parent lot number while being linked with each other by using a lot linking unit in a first table in which a line cycle number representing the line cycle for processing a group of parts and the parent lot number input for being processed in the line cycle represented by the line cycle number are stored while being linked with each other, when a parent lot is input; and storing the line cycle number of the line cycle that has processed a child lot and the child lot number while being linked with each other by using the lot linking unit in a fifth table in which the line cycle number and the child lot number of the part processed in the line cycle represented by the line cycle number, when the child lot is output from the production line after completion of the process.

As described above, according to the present invention, since the parent lot number representing a lot of a part as a material input to the production line and the child lot number representing the lot of the part output from the production line after the completion of a process such as processing and assembly are linked (associated) through the line cycle number representing a process flow from the parent lot to the child lot in the production line, there is an advantage that linking to the parent lot corresponding to the child lot can be performed in an easy manner and history of processing of a specific input part at a specific timing in each production line can be searched in an easy manner.

BRIEF DESCRIPTION OF THE DRAWINGS

FIG. 4 is a schematic diagram showing a configuration of a "location"-"location tag" table 20 shown in FIG. 2.

FIG. 5 is a schematic diagram showing a configuration of a "line"-"location" table 21 shown in FIG. 2.

FIG. 6 is a schematic diagram showing a configuration of a line cycle table 22 shown in FIG. 2.

FIG. 7 is a schematic diagram showing a configuration of a "lot"-"trolley"-"part" table 23 shown in FIG. 2, as an example.

FIGS. 8A and 8B are schematic diagrams showing configurations of a "line cycle"-"processing line input port" table 24 and a "line cycle"-"assembly line input port" table 25 shown in FIG. 2, as an example.

FIG. 9 is a schematic diagram showing a configuration of a "line cycle"-"line output port" table 26 shown in FIG. 2, as an example.

FIG. 10 is a schematic diagram showing a configuration of a part linking table 27 shown in FIG. 2, as an example.

FIG. 11 is a schematic diagram showing a configuration of a trolley current information table 28 shown in FIG. 2 as an example.

FIG. 12 is a schematic diagram showing a configuration of a "part"-"location change history" table 29 in FIG. 2 as an example.

FIG. 13 is a schematic diagram showing a configuration of a supplier order table 30 shown in FIG. 2, as an example.

FIG. 14 is a block diagram showing a configuration of a parts processing management server 1 shown in FIG. 2.

FIG. 26 is a schematic diagram of a display image showing the number of inventory parts for each location, for illustrating an operation of an inventory management unit 36 according to an embodiment of the invention.

DETAILED DESCRIPTION OF THE INVENTION

The present invention links input lot numbers (parent lot numbers) of input lots and loading lot numbers (child lot numbers) of loading lots that are output from a production line and loaded into a trolley through a line cycle number in each production line. In other words, in a production line, a line cycle having a specific line cycle number in which a parent lot been processed can be linked with a child lot having been produced as a result of the process.

Figure 1:
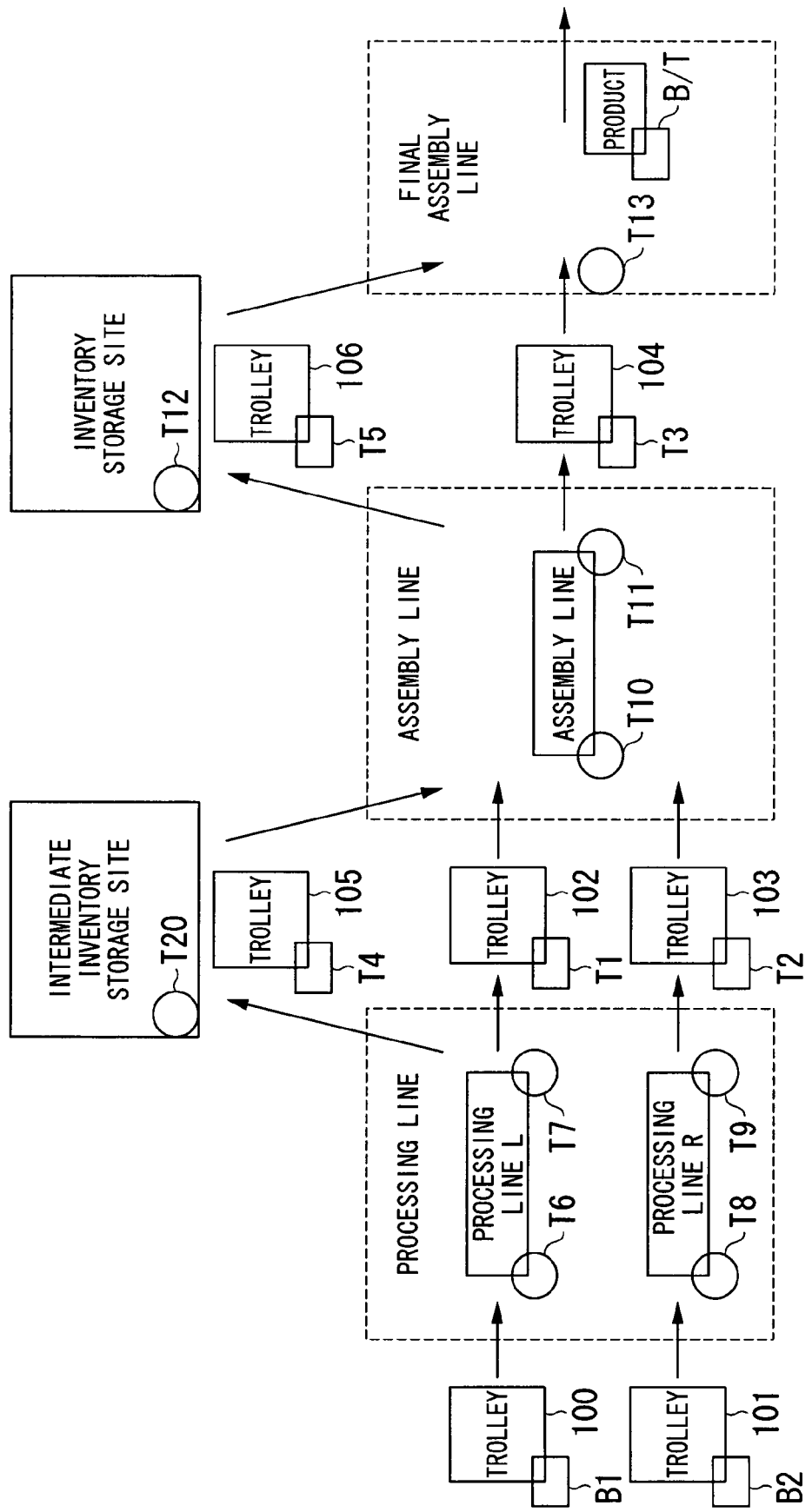
FIG. 1 is a schematic diagram showing a production line using a parts production management system according to an embodiment of the invention.

As a production line according to an embodiment of the present invention, for example, as shown in FIG. 1, two types including a processing line in which one material is processed for producing one part and another processing line in which a plurality of materials is processed for producing one part will be described. In the embodiment of the invention, lot numbers are assigned to parts in units of a trolley. In other words, when parts of the same lot, which are input to a production line, are loaded in different trolleys, they have different lot numbers. For example, when 200 parts C are assembled from 200 parts A (lot 1) and 200 parts B (lot 2), commonly, the lot numbers of the 200 parts C are the same with one another. However, when the parts C are loaded on two trolleys because, for example, the parts C cannot be loaded all together on one trolley, the lot numbers are assigned for each trolley, and accordingly, the lot numbers of the parts C are different for each trolley.

The line cycle is defined as one cycle set from the start of a series of processes in each production line for processing/assembling groups of parts to the end of the series of processes, wherein a predetermined number of groups of parts are set by dividing parts into units of part numbers, lots, or an arbitrary set number of parts by dividing the lot in a production line. Line cycle numbers are used for identifying line cycles for the series of processes. Here, the line cycle numbers may be acquired (obtained) as consecutive numbers generated by simply incrementing a number or acquired in correspondence with each production line. For example, the line cycle numbers may be acquired for each cycle as numbers having plural digits, wherein the upper digits correspond to production lines and the lower digits are numbers generated by sequentially incrementing each cycle.

In one production line, one line cycle or a plurality of line cycles may be set.

As described above, one line cycle for each part number in the production line is completed when the number of parts input from an input port side becomes identical to the number of the parts output in an output port side.

However, for example, when an input operation of parts having one part number is completed in one processing line, an input operation of other parts having a different part number is started before completion of the process for the previous part number. At this moment, since the part numbers are different, the line cycle number is changed, whereby there is a plurality of line cycle numbers in one production line.

Figure 2:
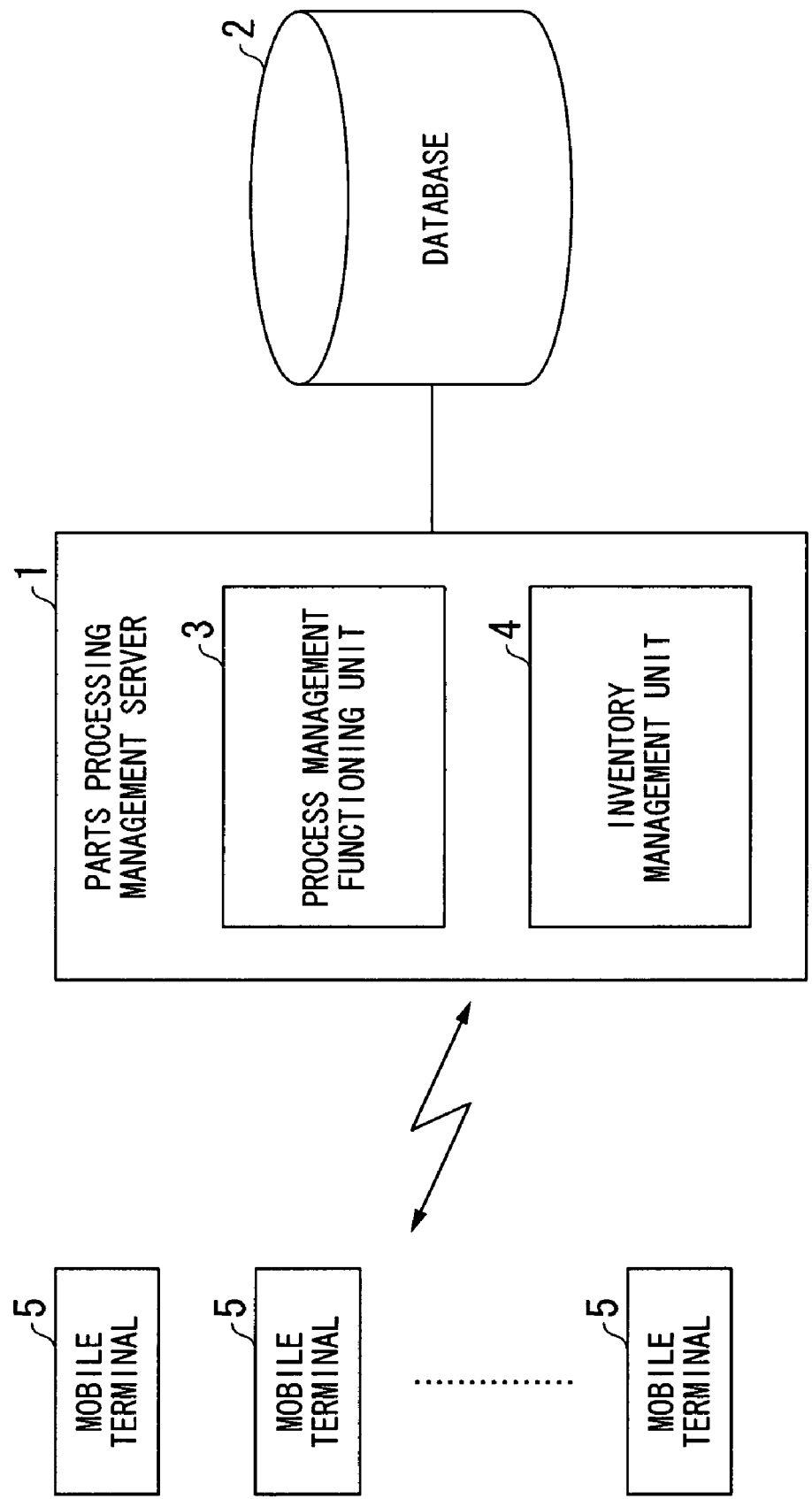
FIG. 2 is a block diagram showing a configuration of a parts production management system according to an embodiment of the invention as an example.

Hereinafter, a parts production management system according to an embodiment of the invention will be described with reference to the accompanying drawings. FIG. 2 is a block diagram showing a configuration of a parts production management system according the embodiment of the invention.

The figure shows that the parts production management system includes a parts processing management server 1 and a database 2. The parts processing management server 1 has a process management functioning unit 3 that links a line cycle to a parent lot number of a parent lot and a line cycle to a child lot number of a child lot number and an inventory management unit 4 that performs inventory management. In the database 2, various tables used for link operations performed in the process management functioning unit 3 and the inventory management unit 4 are stored.

Figure 3:
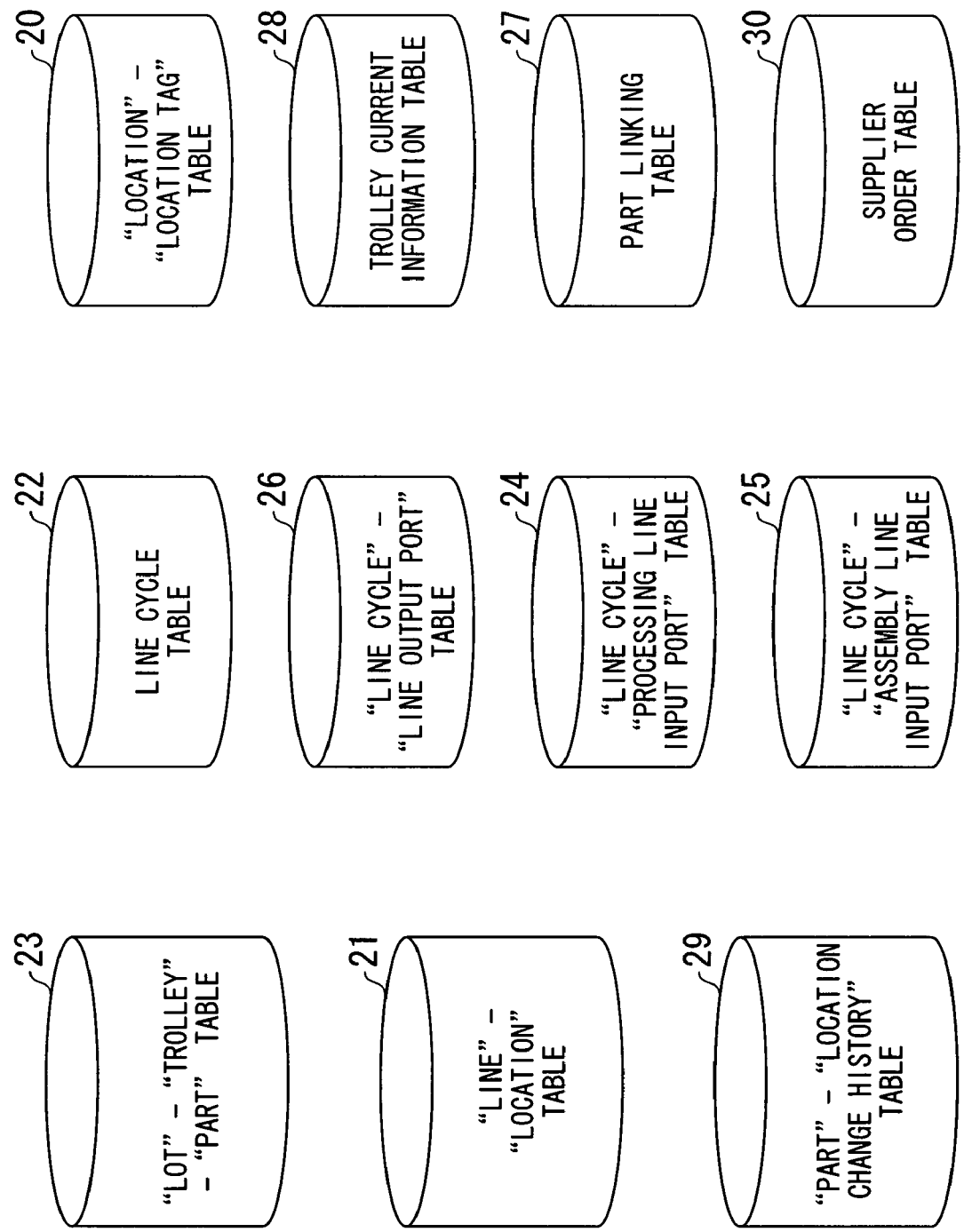
FIG. 3 is a schematic diagram showing a table stored in a database 2 shown in FIG. 2.

The database 2, as shown in FIG. 3, has a plurality of tables including a "location"-"location tag" table 20, a "line"-"location" table 21, a line cycle table 22, a "lot"-"trolley"-"part" table 23, a "line cycle"-"processing line input port" table 24, a "line cycle"-"assembly line input port" table 25, a "line cycle"-"line output port" table 26, part linking table 27, a trolley current information table 28, a "part"-"location change history" table 29, and a supplier order table 30.

Here, in the "location"-"location tag" table 20, as shown in FIG. 4, location tag IDs, which are IDs of IC tags added to the input and output port sides of each production line, are linked with location codes which indicates an input or output port of a production line or an intermediate depository temporarily storing parts after being output from the production lines.

In the "line"-"location" table 21, as shown in FIG. 5, a line code indicating a specific production line, an input port location code that is a location code for indicating an input port of the production line, an output port location code that is a location code for indicating an output port of the production line, the number of types of input parts (indicates the number of types of parts to be processed or assembled in the production line) that are input to the production line, and the like are linked together. While the number of types of input parts is two or more when the production line is an assembly line, the number of types of input parts is one when the production line is a processing line. In other words, the number of types of input parts indicates the number of types of parts required for processing a line cycle of the production line. Thus, when the number of types of input parts is one, it indicates that the production line represented by the line code is a processing line used for processing one part for outputting one processed part. On the other hand, when the number of types of input parts is two or more, it indicates that the production line represented by the line code is an assembly line used for assembling a plurality of parts into one assembled part.

In the line cycle table 22, as shown in FIG. 6, a line cycle number indicating a number for a line cycle, a line code indicating a production line for which the line cycle is set, a line cycle start date/time indicating the time at which the line cycle starts, a line cycle end date/time indicating the time at which the line cycle ends, the total number of input parts indicating the number of parts input to the line cycle, the total number of non-defective parts indicating the number of non-defective parts generated from a processing or assembly process, the total number of defective parts indicating the number of defective parts generated from a processing or assembly process, and the like are stored while being linked together.

In the "lot"-"trolley"-"part" table 23, as shown in FIG. 7, a lot number of parts loaded in a trolley, a trolley code that specifies the trolley, part numbers of parts corresponding to the lot number that are loaded in the trolley, and the like are stored while being linked together.

In the "line cycle"-"processing line input port" table 24, as shown in FIG. 8A, a line cycle number, an order slip number, an input completion identifier (during an input process: 0, completion of an input process: 1) and the like are stored while being linked.

In the "line cycle"-"assembly line input port" table 25, as shown in FIG. 8B, a line cycle number, an input lot number for an input lot loaded in the trolley, an input completion identifier (during an input process: 0, completion of an input process: 1) indicating the input status, and the like are stored while being linked together.

In the "line cycle"-"line output port" table 26, as shown in FIG. 9, a line cycle number, a loaded lot number for a lot loaded in a trolley, and the like are stored while being linked together, In the part linking table 27, as shown in FIG. 10, a part number (input part number) of a part before being input to a production line, that is, a part number of an input part, a part number of a part when being output from a production line, that is, a part number (loading part number) of an output part, a line code specifying the production line, and the like are stored while being linked together. In other words, in the part linking table 27, when the production line is a processing line, one loading part number is set for one input part number. On the other hand, when the production line is an assembly line, one loading part number that corresponds to part numbers of the parts used for the assembly is set (for example, when two parts A and B are assembled into an assembled part C, the linking relationship between two input part numbers and a loading part number including part A-part C and part B-part C is defined in the part linking table 27).

In the trolley current information table 28, as shown in FIG. 11, a trolley code, a location code indicating the location of a trolley, the part number of a part loaded in the trolley, the lot number of the part, a trolley ID that is an ID of an IC tag attached to the trolley, the number of currently loaded parts that indicates the number of currently loaded parts in the trolley, and the like are stored.

The "part"-"location change history" table 29, as shown in FIG. 12, is a table having change history that is changed when a process that changes inventory figures of parts in each location is performed. In the "part"-"location change history" table 29, there are stored a change history number assigned as a sequential number in the order of generation of the process causing the change in the inventory figures, date information indicating the data/time when the change history number is acquired due to change corresponding to the change history number, a trolley code indicating a trolley that is registered in the change history, the part number of a part, a location code indicating the location where the change in the inventory figures of parts occurs, the number of normally loaded parts and the number of inventory loading that indicate the number of loaded parts, the number of normally unloaded parts and the number of unloaded inventory parts that indicate the number of parts unloaded from inventory parts, and the correction amount used for correcting the change in the inventory figures.

Here, since the numbers of the parts are counted by an operator in the change of inventory figures, the correction amount is used for automatically correcting input due to a mistake of the operator so as to represent actual inventory figures as closest as possible.

In the supplier order table 30, as shown in FIG. 13, an order slip number (a trolley ID as a first material part and a lot number of the input lot), the part number of a part corresponding to the order slip number, the number of delivered parts indicating the number of the parts when a part is delivered, the number of currently loaded parts (a number calculated by subtracting the number of input parts from the number of delivered parts) indicating the number of parts currently loaded in the trolley, and the like are stored while being linked together.

Hereinafter, the structure of the process management functioning unit 3 of the parts processing management server 1 according to the embodiment of the invention will be described with reference to FIG. 14. FIG. 14 is a block diagram showing the detailed structure of the parts processing management server 1 shown in FIG. 2 as an example.

The process management functioning unit 3, as shown in FIG. 14, includes a trolley information reading unit 31, a production line detecting unit 32, a line cycle management unit 33, a lot linking unit 34, a search unit 35, and a transmission/reception unit 36. Here, FIG. 14 is a block diagram of the process management functioning unit 3 showing its structure in more details. Hereinafter, the transmission/reception unit 36, the production line detecting unit 32, the line cycle management unit 33, and the lot linking unit 34 will be described in that order. The search unit 35 will be described later.

Transmission/Reception Unit 36

The transmission/reception unit 36 receives a location tag ID detected in the input or output port of the production line, a trolley ID indicating a trolley loaded with parts to be input to the production line or a trolley loaded with parts that have been processed in the production line, the number of parts input to the production line from the trolley, the number of parts loaded in the trolley from the production line, and the like that are sent from a mobile terminal 5 by an operator.

Here, the mobile terminal 5 shown in FIG. 2 has a bar code reader or an IC tag (for example, an RF tag) reader/writer. The mobile terminal 5 reads out trolley IDs from bar codes B1 and B2 or IC tags T1 to T5, reads out location tag IDs from the IC tags T6 to T13 and T20 that are provided in the input port used for the input of parts or in the output port used for the output of processed parts for each production line, and sends the trolley IDs or the location IDs to the parts processing management server 1.

Trolley Information Reading-Out Unit 31

Referring back to FIG. 14, the trolley information reading unit 31 reads out an input lot number corresponding to the trolley ID received from the mobile terminal 5 from the trolley current information table 28.

Production Line Detecting Unit 32

The production line detecting unit 32 reads out a location code corresponding to the location tag ID received from the mobile terminal 5, from the "location"-"location tag" table 20 for identifying the production line and reads out a line code corresponding to the location code from the "line"-"location" table 21 using the location code.

In other words, the production line detecting unit 32 acquires a line code corresponding to the location tag ID received by the transmission/reception unit 36 with reference to the "line"-"location" table 21.

Line Cycle Management Unit 33

When setting a line cycle corresponding to a lot number of an input part, the line cycle management unit 33 reads out information on a line cycle that is currently operated in the production line corresponding to the line code, which is read out by the production line detecting unit 32, from the line cycle table 22 and detects/determines the line cycle number to be linked on the basis of the line cycle information that is currently operated.

When detecting that there is no operated line cycle on the basis of the line cycle information read out from the line cycle table 22, the line cycle management unit 33 acquires a new line cycle number and sets the line cycle number to be linked with the new line cycle number. On the other hand, when detecting that there is a operated line cycle, the line cycle management unit 33 acquires an input lot number using the latest line cycle number from the "line cycle"-"line input port" table ("line cycle"-"processing line input port" table 24 and the "line cycle"-"assembly line input port" table 25).

In addition, the line cycle management unit 33 acquires the part number of a new input part with reference to the trolley current information table 28 by using the trolley code.

Then, the line cycle management unit 33 acquires an input part number corresponding to the input lot number from the "lot"-"trolley"-"part" table 30 and compares the input part number with the part number of the new input part. When the input part number and the part number of the new input part are identical, the line cycle management unit 33 sets the latest line cycle number to the line cycle number to be linked.

On the other hand, when detecting that the input part number and the part number of the new input parts are not identical, the line cycle management unit 33 reads out the number of the types of input parts corresponding to the location code from the "line"-"location" table 21 and compares the number of the types of input parts with the input part number, whereby detecting whether the part required for starting the line cycle is already supplied, and then, the line cycle management unit 33 acquires a line cycle number.

Lot Linking Unit 34

The lot linking unit 34 registers an input lot number and a line cycle number in the input port of the production line into the "line cycle"-"line input port" table (a "line cycle"-"processing line input port" table 24 and a "line cycle"-"assembly line input port" table 25) while being linked with each other, that is, being associated with each other.

The lot linking unit 34 acquires a loading lot number in the output port of the production line. For example, in this embodiment, the loading lot number is acquired in the form of a line code_year/month/date_serial number. When acquiring a new loading lot number, the lot linking unit 34 extracts a loading lot number that is the largest serial number as the line code_year/month/date_serial number corresponding to the production line, sets the new loading lot number to a number generated from adding one to the serial number of the loading lot number, and writes the line cycle number read by the line cycle management unit 33 and the acquired loading lot number in the "line cycle"-"line output port" table 26 while being linked together for the registration thereof.

As described above, by searching the database 2 using the lot number of the final product and sequentially searching lot numbers linked by the corresponding line cycle number, so that the lot linking unit 34 links the input lot number to the line cycle number and loading lot number to a same line cycle number as that of a corresponding input lot number, the lot numbers and history of the process can be extracted as a tree structure. In other words, the link between the input lot number and the loading lot number can be extracted through the line cycle number. Here, in the embodiment, since the processing lines L and R shown in FIG. 1 are first production lines to which materials are input, order slip numbers of the parts are used as the lot numbers of the parts loaded in the first trolleys 100 and 101, and accordingly, a "line cycle"-"line input port" table having a configuration different from the production line in the next stage is used. However, when the lot numbers are changed to the order slip numbers of the parts loaded in the trolleys 100 and 101 so as to use lot numbers corresponding to the order slip numbers, the "line cycle"-"line input port" table having the same configuration as the "line cycle"-"line input port" table in the next stage can be used.

Hereinafter, an outline of an operation of a parts processing management system according to an embodiment of the invention shown in FIGS. 2, 3, and 14 will be described with reference to FIG. 1, with primary focus on a process of an operator.

Step S1:

The trolleys 100 and 101 are moved to processing lines L and R from a material storage site (not shown) for producing parts by processing materials in processing lines L and R.

Step S2:

The operator reads order slip numbers (trolley IDs when moved from material storage site, lot numbers in the trolley) from a bar code B1 of a trolley 100 and a bar code B2 of a trolley 101 using a mobile terminal 5, reads location tag IDs from an IC tag T6 disposed in the input port side of a processing line L and an IC tag T8 disposed in the input port side of a processing line R, and sends the order slip numbers and the location tag IDs to a parts processing management server 1. Accordingly, by searching a "location"-"location tag" table 20, the part processing management server 1 acquires location codes that are location information indicating the input and output ports of the processing line and detects start of input of lots of the materials into the processing lines L and R.

Step S3:

After the start of the input of the lots of the materials, the number of input parts of the materials is counted by counters provided in the input ports of the processing lines L and R. The operator sends the counted number in the counter to the parts processing management server 1 as an input number indicating the number of input parts by using the mobile terminal 5.

Step S4:

The operator loads processing completed parts in the processing lines L and R into the trolleys 102 and 103.

At this moment, the operator detects the numbers of parts loaded into the trolleys 102 and 103 by the counted numbers provided in places where the loading operations in the processing lines L and R are performed and sends the numbers of the parts to the parts processing management server 1 as the number of loaded parts by using the mobile terminal 5. Since only non-defective parts are loaded into the trolleys, the numbers of loaded parts are substantial numbers of non-defective parts.

Then, the operator reads out the location tag IDs from the IC tags T7 and T9 provided in the outlet ports of the processing lines L and R.

Then, the operator reads out the trolley IDs from the IC tags T1 and T2 attached to the trolleys 102 and 103 and sends the trolley IDs to the parts processing management server 1.

Step S5

When loading of all the parts, which have been processed in the processing lines, into the trolleys 102 and 103 is completed, the operator notifies the parts processing management server 1 of the completion of the line cycles for the processing of the parts by using the mobile terminal 5. At this moment, the operator sends control information indicating the completion of the line cycles, current time (date/time of the completion of the line cycles), location tag IDs to the parts processing management server 1 as line cycle completion information by using the mobile terminal 5.

Here, the parts processing management server 1 links an input lot that is a parent lot and a loading lot that is a child lot together through a line cycle number. In other words, when receiving the above-described data, the parts processing management server 1 links parts that are input from the trolleys 100 and 101 and parts that are processed to be output and loaded in the trolleys 102 and 103 for the processing lines L and R through the line cycle numbers by using the above-described data.

When the processing is completed, the operator counts the number of the parts loaded into the trolleys from the output port of each production line and determines whether the counted number is identical to the number of parts input to the production line, whereby checking the completion of the line cycle. At this moment, the operator may check the number of loaded parts by reading the counted number of a counter disposed in the output port of the production line and comparing the read counted number with the number of parts loaded into the trolley.

Step: S6

Some trolleys directly move to an assembly line in the next stage like the above-described trolleys 102 and 103, and other trolleys temporarily move to an intermediate inventory storage site like the trolley 105. In the input and output ports of the intermediate inventory storage site, an IC tag T20 indicating the intermediate inventory storage site is provided.

The operator reads out the location tag IDs from the IC tags T10 and T20 disposed in each location and the trolley IDs from the IC tags T1, T2, and T4 attached to the trolleys, at the moved locations and sends the location tag IDs and the trolley IDs to the parts processing management server 1, using the mobile terminal 5.

Step S7:

When an operation for inputting of the processed parts into the assembly line is performed, the operator, like in step S2, reads out trolley IDs of IC tags T1 and T2 attached to trolleys 102 and 103, reads out a location tag ID of an IC tag T10 disposed in a location port of the assembly line, and sends the input of lots into the assembly line that assembles intermediate products to the parts processing management server 1.

Step S8:

The operator sends the numbers of input parts, which are counted by a counter provided in the input port of the assembly line, linked with each trolley ID to the parts processing management server 1. This process is repeated for the number of times of the number of input trolleys, for example, twice (for the input of the trolleys 102 and 103 in this embodiment).

Step S9:

When the process in the processing line is completed, the operator loads the assembled parts into a trolley 104. At this moment, the operator reads out a location tag ID from an IC tag T11 disposed in the output port of the assembly line, reads out a trolley ID from an IC tag T3 attached to the trolley 104, and sends the location tag ID and the trolley ID together with the number of loaded parts as the number of parts loaded in this trolley to the parts processing management server 1.

When loading of all the assembled parts into the trolley 104 is completed, the operator notifies the parts processing management server 1 of completion of the line cycle of the parts for the assembly line by using the mobile terminal 5. At this moment, the operator sends control information indicating the completion of the line cycle, current time (date/time of the completion of the line cycle), the location tag ID to the parts processing management server 1 as line cycle completion information by using the mobile terminal 5.

Step S10:

When the parts are moved to the final assembly line, the operator reads out a location tag ID from an IC tag T13 disposed in the input port of the final assembly line, reads out a trolley ID from an IC tag T3 attached to the trolley 104, and sends the location ID and the trolley ID to the parts processing management server 1. Then, the operator reads out identification information (recording medium number to be described later) from a recording medium (a bar code or an IC tag) for the identification information finally attached to a product, sends the identification information to the parts processing management server 1, and performs an operation for linking between the identification information and the lot number for the input of parts.

The operator sends product assembly completion information indicating completion of product assembly to the parts processing management server 1 using the mobile terminal 5, whenever a product is assembled in the final assembly line.

Hereinafter, processes of linking data performed by the parts processing management server 1 according to the embodiment of the invention on the basis of the above-described operator's notification of data will be described in accordance with steps S1 to S9 described above.

Figure 15:
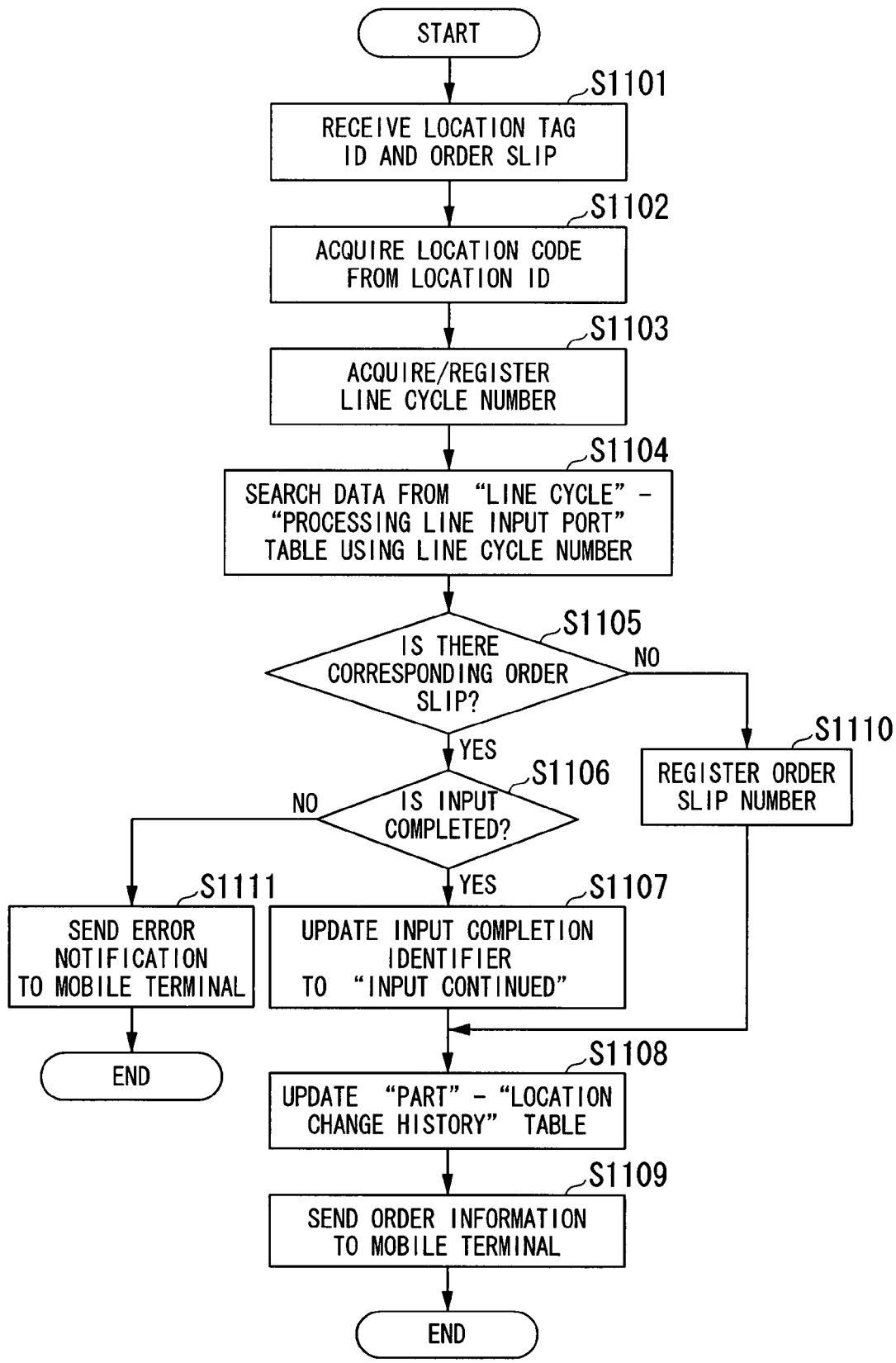
FIG. 15 is a flowchart showing a process of the inputting of parts into a production line (processing line) performed by a parts processing management server 1 according to an embodiment of the invention, as an example.

A process of inputting parts into a processing line shown in a flowchart of FIG. 15 is performed in the parts processing management server 1 in accordance with the operator's operation performed in step S2. FIG. 15 is a flowchart showing a process of inputting parts according to an embodiment of the invention, as an example.

The transmission/reception unit 36 receives the location ID sent from the mobile terminal 5 by the operator and the order slip number (corresponds to the input lot number and the trolley ID) read-out from the bar code B1 of the trolley 100 or the bar code B2 of the trolley 101 and outputs the location tag ID and the order slip number to the production line detecting unit 32 (step S1101). In a description below, a case in which the processing lines L and R are configured will be described.

Next, the trolley information reading unit 31 reads out order information (a part number, the number of delivered parts, the number of currently loaded parts, etc.) corresponding to the input order number (trolley ID) with reference to the supplier order table 30. The production line detecting unit 32 reads out a location code corresponding to the location tag ID from the "location"-"location tag" table 20 and then, reads out a line code corresponding to the location code from the "line"-"location" table 21 (step S1102).

Next, the line cycle management unit 33 acquires line cycle numbers of line cycles in the processing lines L and R (described later in more details) and stores the line cycle numbers together with the line codes in the line cycle table 22 for registration of the line cycle numbers (step S1103), according to a routine for processing line cycle number registration/acquisition.

Next, the lot linking unit 34 searches the "line cycle"-"processing line input port" table 24 by using the line cycle number and reads out an order slip number and an input completion identifier status corresponding to the line cycle number (step S1104).

Then, the lot linking unit 34 detects whether the order slip number read-out in step S1102 is registered as a lot number. When it is detected that the order slip number is written as an input lot number corresponding to the line cycle number in step S1104, the process proceeds to step S1106. On the other hand, when it is detected that the order slip number is not written, the process proceeds to step S1110 (step S1105).

Then, the lot linking unit 34 detects whether the input completion identifier read out from step S1104 is "input completed" ("1") or "input continued" ("0") (step S1106). When the input completion identifier detected by the lot linking unit 34 is "input completed", the process proceeds to step S1107. On the other hand, when the input completion identifier is "input continued", the process proceeds to step S1111.

When detecting that the input completion identifier is "input completed", the lot linking unit 34 rewrites the input completion identifier to "0" from "1", that is, changes the input completion identifier to "input continued" from "input completed", and the process proceeds to step S1108 (step S1107).

When detecting that the input completion identifier is "input continued", the lot linking unit 34 sends error notification information indicating that an input starting process is not required again to the mobile terminal 5 (step S1111).

On the other hand, when it is detected that the order slip number corresponding to the line cycle number is not written in the "line cycle"-"processing line input port" table 24 in step S1105, the lot linking unit 34 writes the input lot number as the order slip number in correspondence with the line cycle number, writes the input completion identifier as "input continued", and performs a data registration process (step S1110).

Then, the lot linking unit 34 acquires a change history number (for example, the initial change history number is incremented sequentially), from the "part"-"location change history" table 29, writes the location code of moved place as the trolley code and the location code, and writes the part number and the number of currently loaded parts as the part number and the number of normally loaded parts (STEP S1108).

Then, the lot linking unit 34 sends the order information to the mobile terminal 5 through the transmission/reception unit 36 (step S1109).

Figure 16:
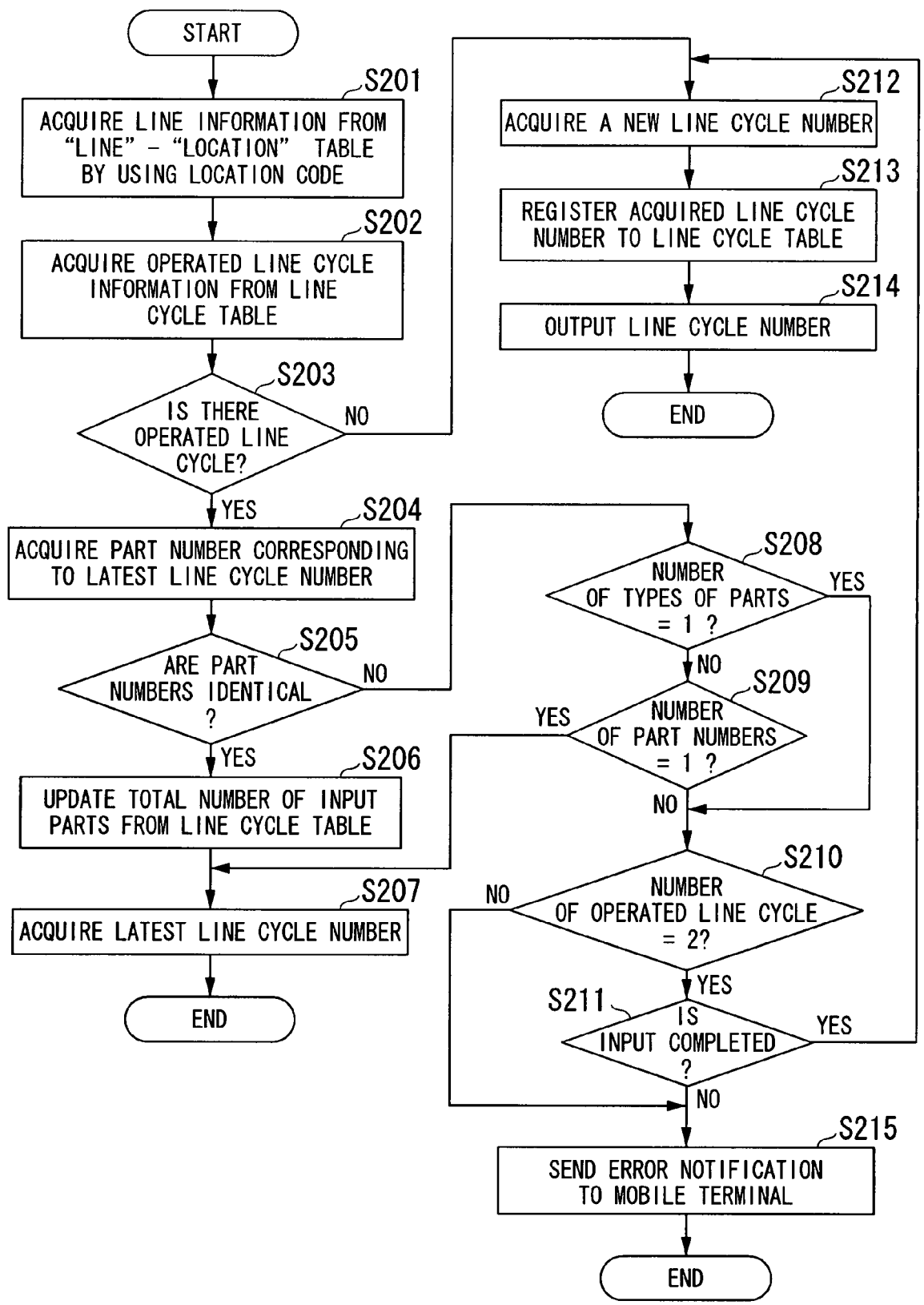
FIG. 16 is a flowchart showing a process for registering and acquiring line cycle numbers in the input start processing shown in FIG. 15.

Hereinafter, a routine for a process for registering/acquiring line cycle numbers in the routine for a process for starting input will be described with reference to a flowchart shown in FIG. 16. FIG. 16 is a flowchart showing a process (step S1103 shown in the flowchart of FIG. 15 or step S1203 shown in a flowchart of FIG. 22) for registering/acquiring a line cycle number as an example. Here, the flowchart shown in FIG. 16 is configured on the assumption that the number of types of input parts is two and the maximum number of operated cycles per line is two.

The production line detecting unit 32 searches the "line"-"location" table 21 using the location code (acquired in step S1102) of the input moved place and reads out line information (a line code of a processing line, a location code of the input port, a location code of the output port, the number of types of input parts, etc.) corresponding to the location code (step S201).

Then, the line cycle management unit 33 reads out line cycle information (a line cycle number, a start date of the line cycle, an end date of the line cycle, total amount of input parts, total amount of non-defective parts, total amount of defective parts, etc.) corresponding to the line code from the line cycle table 22 (step S202).

Then, the line cycle management unit 33 detects whether there is an operated line cycle corresponding to the line code by detecting a line cycle number, in which start data of the line cycle is stored and end data of the line cycle is not stored, in the line cycle information (step S203). When the line cycle management unit 33 detects a operated line cycle, the process proceeds to step S204. On the other hand, when the line cycle management unit 33 detects no operated line cycle, the process proceeds to step S212.

Next, the line cycle management unit 33 detects/reads out the latest line cycle number (the first one if the line cycle numbers are sequentially updated for rearrangement and the largest line cycle number if the line cycle numbers are sequentially incremented) with reference to the line cycle table 22, reads out an order slip number (input lot number) corresponding to the line cycle number from the "line cycle"-"line input port" table 24, and reads out part numbers corresponding to the order slip number from the trolley current information table 28 with duplicate part numbers excluded (step S204).

The line cycle management unit 33 compares a part number of the part processed in accordance with the latest line cycle with an input part number of the part loaded into the trolley corresponding to the trolley ID input from the mobile terminal 5 (step S205). When the line cycle management unit 33 determines that the part number of the part processed in accordance with the latest line cycle and the part number of the part loaded into the trolley are identical, the process proceeds to step S206. On the other hand, when the line cycle management unit 33 determines that the part number of the part processed in accordance with the latest line cycle and the part number of the part loaded into the trolley are not identical, the process proceeds to step S208.

When it is determined that the part numbers are identical as the result of the comparison in step S205, the line cycle management unit 33 updates the total number of input parts by adding the number of input parts input from the mobile terminal 5 to the total number of input parts corresponding to the line cycle number of the latest line cycle in the line cycle table 22 (step S206).

Then, the line cycle management unit 33 detects the latest line cycle number among the line cycle numbers corresponding to the line code with reference to the line cycle table 22, reads out the latest line cycle number, outputs the latest line cycle number, and completes the routine for the process of registering/acquiring a line cycle number (S207).

When it is determined that the part numbers are not identical in the comparison in step S205, the line cycle management unit 33 reads out the number of types of input parts corresponding to the line code from the "line"-"location" table 21 and detects whether the number of the types of the input parts is one (step S208). When the line cycle management unit 33 detects that the number of the types of the input parts is one, the process proceeds to step S210. On the other hand, when the line cycle management unit 33 detects that the number of the types of the input parts is not one (the number of the types of the inputs is two or more, and in FIG. 16, the number of the types of the inputs is two), the process proceeds to step S209.

Next, the line cycle management unit 33 searches for an input lot number corresponding to the line cycle number from the "line cycle"-"processing line input port" table 24, reads out a part number in accordance with the input lot number from the "lot"-"trolley"-"part" table 23, and counts the number of the part numbers. Then, the line cycle management unit 33 sets the number of the parts to the resultant counted number and detects whether the number of the parts is one (step S209). When the line cycle management unit 33 detects that the number of the part numbers is one, the process proceeds to step S207. On the other hand, when the line cycle management unit 33 detects that the number of the part numbers is not one (the number of the types of the inputs is two or more, and in FIG. 16, the number of the part numbers is two), the process proceeds to step S210.

Next, the line cycle management unit 33 detects whether the number of line cycles operated in a production line corresponding to the line code is one, with reference to the line cycle table 22 (step S210). When the line cycle management unit 33 detects that the number of operated line cycles is one, the process proceeds to step S211. On the other hand, when the line cycle management unit 33 detects that the number of operated line cycles is not one (the number of operated line cycles is two or more, and in FIG. 16, the number of operated line cycles is two), the process proceeds to step S215. In the production line according to the embodiment, when an input operation of a first part is completed, and an input operation of a second part having a different part code is started to initiate a line cycle during the line cycle for a process of processing the first part, line cycles are identified to be different for each part number, and different line cycle numbers are assigned to the line cycles.

When detecting that the number of operated line cycle is one, the line cycle management unit 33 reads out the input completion identifier of an order slip number (or an input lot number) corresponding to the line cycle number with reference to the "line cycle"-"processing line input port" table 24 and detects whether the input completion identifier is "1" (step S211). When the line cycle management unit 33 detects that the input completion identifier is "1", the process proceeds to step S212. On the other hand, when the line cycle management unit 33 detects that the input completion identifier is not "1", the process proceeds to step S215.

In step S212, the line cycle management unit 33 increments a line cycle number corresponding to the line code, and the line cycle number is newly acquired. Here, it may be configured that a plurality of line cycle numbers is set in advance while being linked with the line code and the line cycle numbers are sequentially acquired from the set numbers each time a new line cycle is generated.

Then, the line cycle management unit 33 writes the newly acquired line cycle number in the line cycle table 22 in correspondence with each line code and writes the number of input parts sent from the mobile terminal 5 as the total number of input parts in correspondence with the line code, and writes current date/time into the start date of the line cycle, whereby the registration of the data is performed (step S213).

Then, the line cycle management unit 33 outputs the newly acquired line cycle number as the latest line cycle number and completes the process (step S214).

On the other hand, when detecting that the number of the line cycles is not one in step S210 or the input completion identifier is not "1" in step S211, the line cycle management unit 33 notifies the mobile terminal 5 of an error through the transmission/reception unit 36 and completes the routine for the process for registering/acquiring a line cycle number (step S215).

As described above, in the flowchart shown in FIG. 16, when the part number of the newly input part which is read out from the trolley current information table 28 is not identical to the input part number that is read-out from the "lot"-"trolley"-"part" table 30 and the number of the types of the input parts is two or more, if the line cycle management unit 33 detects that the number of types of the input parts is greater than the number of the input part numbers (the number of types of input parts>the number of input part numbers), it determines that all types of the parts required for processing the line cycle are not provided and sets the linking line cycle number to the latest line cycle number read-out from the line cycle table 22 in step S207.

Accordingly, as described above, when detecting that the number of types of input parts is greater than the number of input part numbers (i.e., the number of types of input parts>the number of input part numbers), the line cycle corresponding to the previously acquired line cycle number is currently operated and the line cycle management unit 33 uses the latest line cycle number stored in the line cycle table 22 for linking as a line cycle number corresponding to a part group of an output part.

On the other hand, when detecting that the number of types of the input parts is equal to the number of the input part numbers (i.e., the number of types of input parts=the number of input part numbers), the line cycle management unit 33 determines that all types of the parts required for processing the line cycle are provided, acquires a new line cycle number in step S212, and sets the linking line cycle number to the new line cycle number.

In other words, when detecting that the above-described numbers are identical, the line cycle management unit 33 detects that a part of a new part number is input and all the types of parts required for initiating the line cycle are supplied and, accordingly, acquires the linking line cycle number.

For example, when the number of types of parts is n, n=1 for a processing line, and accordingly, in the processing line, a line cycle number is not acquired so long as the counting number of the input part numbers is not "1" and a line cycle number is acquired when the counting number of the input part numbers is "1". On the other hand, in an assembly line, a line cycle number is not acquired so long as the counting number of the input part numbers is not n, and when the counting number of the input part numbers is n, a line cycle number is acquired. Thus, it is possible to detect start of the line cycle in an easy manner, whereby the process for acquiring the line cycle number can be performed in an easy manner, in accordance with the start of the line cycle.

Figure 17:
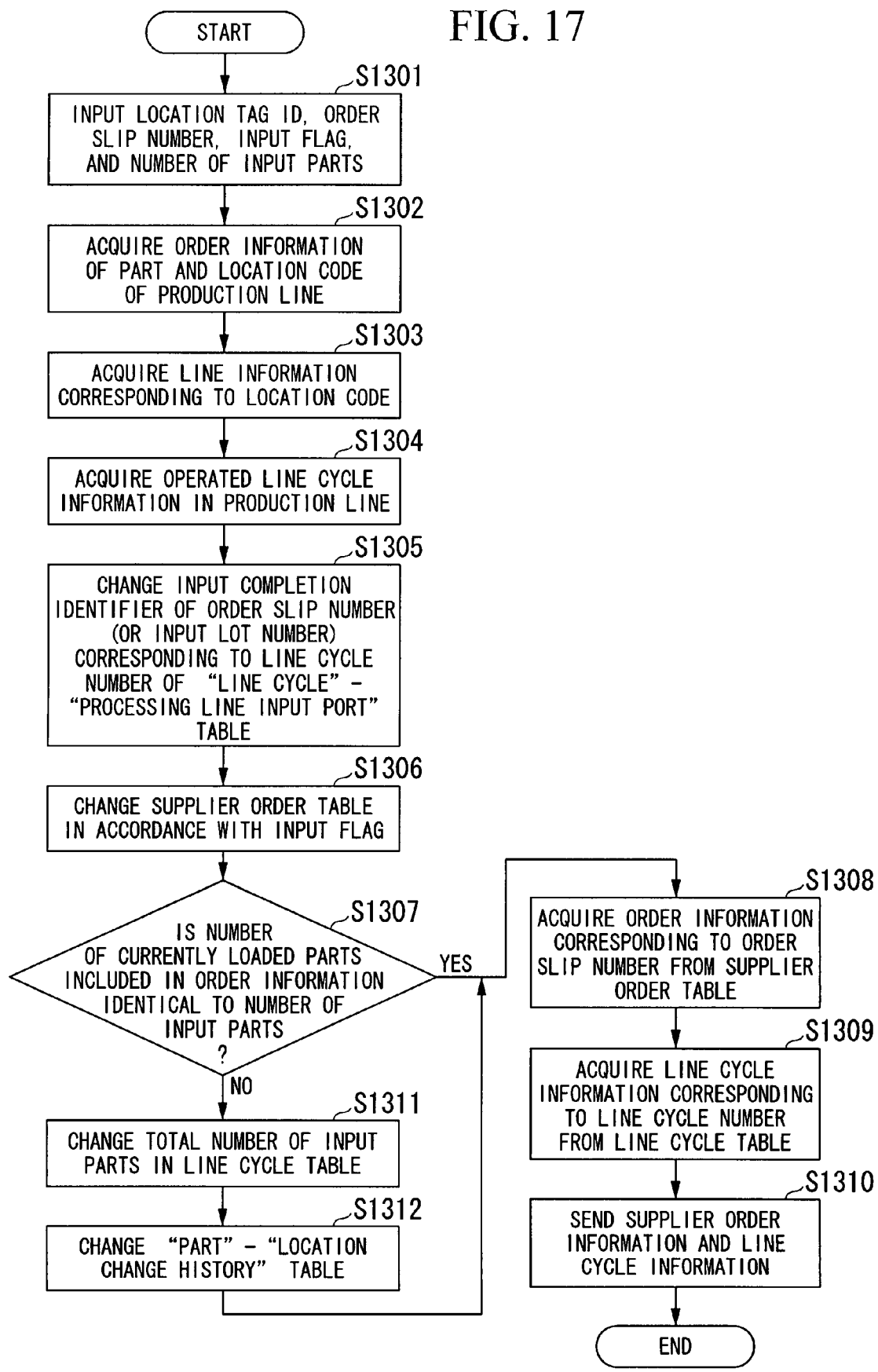
FIG. 17 is a flowchart showing a process of inputting parts into a production line (processing line) performed by a part processing management server 1 according to an embodiment of the invention, as an example.

When an input operation of a part is completed in the parts processing management server 1 in correspondence with the operator's input process for the processing line in step S3 and information indicating completion of the operation for input of all the parts is notified through the mobile terminal 5 from the operator, a routine for a process for completion of input shown in a flowchart of FIG. 17, to be described below, is performed. FIG. 17 is a flowchart showing a process of completing the inputting of parts according to an embodiment of the invention, as an example. It is assumed that the input process is performed by using an order part number as a lot number of a part loaded in the trolley. However, a lot number corresponding to the order slip number may be used as the lot number.

The transmission/reception unit 36 receives the location tag ID and the order slip number that are sent from the mobile terminal 5 by the operator, an input flag indicating completion of input of all the parts, and the number of input parts and outputs the received data to the trolley information reading unit 31 and the production line detecting unit 32 (step S1301).

Here, the number of input parts is a number input to the mobile terminal 5 in accordance with operator's reading of the counted number of the counter provided in the input port of each processing line or a number read-out by the mobile terminal 5 from the counter using wireless communication or the like.

Next, the trolley information reading unit 31 reads out order information corresponding to the input order slip number with reference to the supplier order table 30.

The production line detecting unit 32 reads out a location code corresponding to the location tag ID from the "location"-"location tag" table 22 (step S1302).

The line cycle management unit 33 reads out line information corresponding to the location code from the "line"-"location" table 21 (step S1303).

Then, the line cycle management unit 33 reads out currently operated line cycle information corresponding to the line code of the line information from the line cycle table 22 (step S1304).

Then, the line cycle management unit 33 changes the input completion identifier for an order slip number (or input lot number) corresponding to the line cycle number included in the line information from "input continued" ("0") to "input completed" ("1") in the "line cycle"-"processing line input port" table 24 (step S1305). In other words, the line cycle management unit 33 indicates the completion of input of parts for a production line specified by the line code.

Then, the line cycle management unit 33 updates the number of currently loaded parts included in the supplied order table 30 on the basis of the input flag (step S1306). Here, when detecting that the input flag is "true" (all parts are input), the line cycle management unit 33 rewrites the number of currently loaded parts in the supplied order table 30 corresponding to the read order slip number to "0".

On the other hand, when detecting that the input flag is "false" (some parts are input), the line cycle management unit 33 rewrites the number of currently loaded parts corresponding to the read order slip number to a number generated from subtracting the number of input parts from the number of currently loaded parts as a new number of currently loaded parts.

Then, the line cycle management unit 33 detects whether the number of currently loaded parts included in the order information is identical to the number of input parts. While the process proceeds to step S1308 when the line cycle management unit 33 detects that the number of currently loaded parts is identical to the number of input parts, the process proceeds to step S1311 when the line cycle management unit 33 detects that the number of currently loaded parts is not identical to the number of input parts (step S1307).

When detecting that the number of currently loaded parts is identical to the number of input parts, the line cycle management unit 33 reads out order information corresponding to the order slip number acquired in step S1301 from the supplied order table 30 (step S1308).

Then, the line cycle management unit 33 reads out line cycle information corresponding to the line cycle number in step S1304 from the line cycle table 22 (step S1309).

Then, the line cycle management unit 33 sends the supplier order information read-out in step S1308 and the line cycle information read-out in step S1309 to the mobile terminal 5 through the transmission/reception unit 36 (step S1310).

On the other hand, when detecting that the number of currently loaded parts is not identical to the number of input parts in step S1307, the line cycle management unit 33 adds "the number of input parts−the number of currently loaded parts" to the total number of input parts corresponding to the line cycle number in step S1304 in the line cycle table 22 (step S1311).

Next, the line cycle management unit 33 registers data by writing change history in correspondence with the part number in step S1301 into the "part"-"location change history" table 29 (step S1312). Here, when detecting that the input flag is "true", the line cycle management unit 33 writes the input location code into a location code area, writes the part number in the supplier order table 30 into a part number area, and writes a value calculated from subtracting the number of currently loaded parts from the number of input parts into a correction amount area. On the other hand, when detecting that the input flag is "false", the line cycle management unit 33 writes the input location code into the location code area, writes the part number in the supplier order table 30 into the part number area, and writes a value calculated from subtracting the number of currently loaded parts in the supplier order table 30 from the number of input parts into an area for the number of a normal loading.

Figure 18:
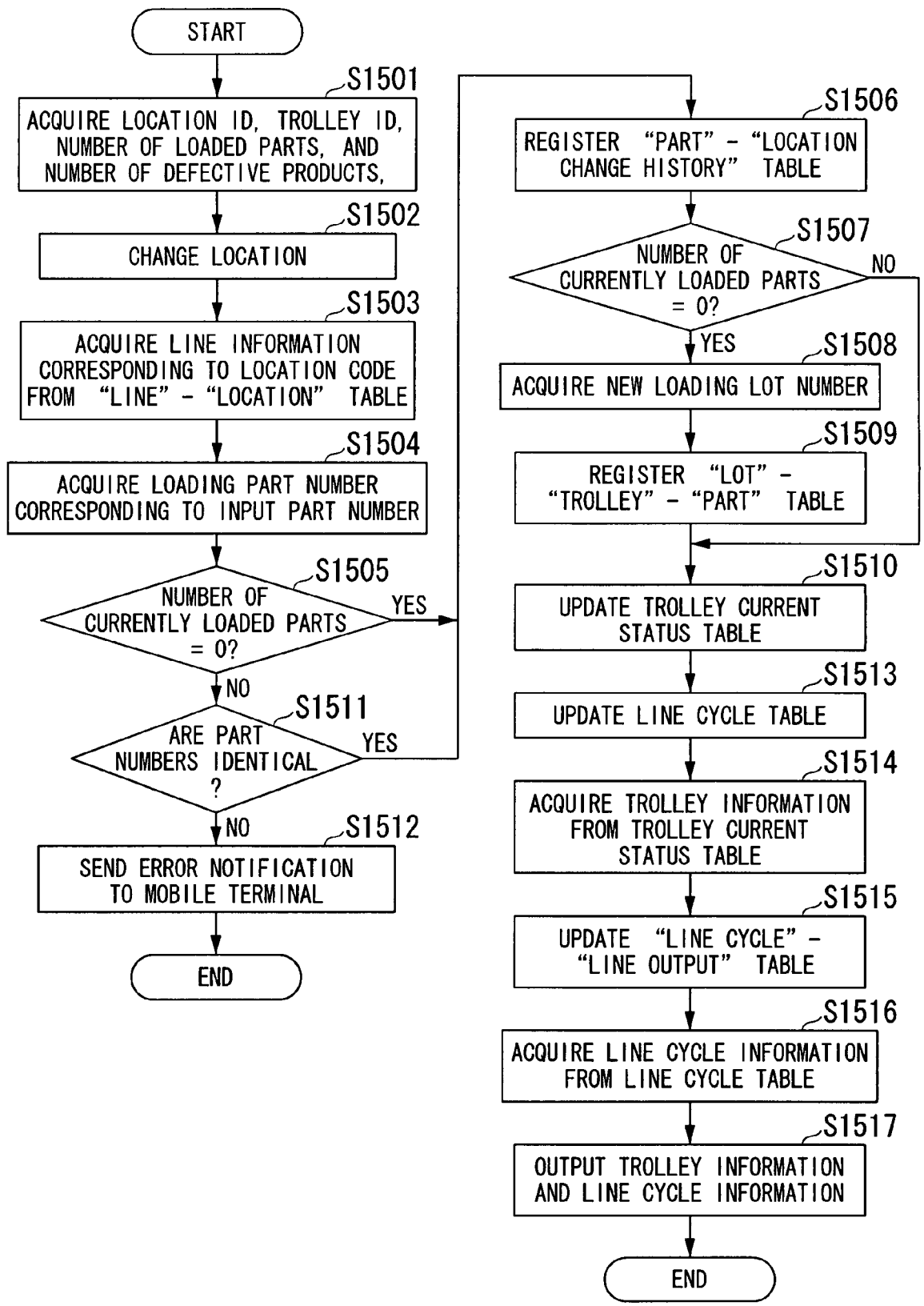
FIG. 18 is a flowchart showing a process of completing the loading of parts into a trolley in a production line performed by a parts processing management server 1 according to an embodiment of the invention, as an example.

Next, a routine for a process of ending loading shown in a flowchart of FIG. 18, described below, is performed in the parts processing management server 1 in correspondence with the process of loading parts into the trolley from the processing line of step S4. FIG. 18 is a flowchart showing a process of completing the loading of parts into a trolley, as an example.

The transmission/reception unit 36 receives the location tag ID and the trolley ID which are sent from the mobile terminal 5 by the operator, the number of loaded parts in the trolley, and the number of defective parts that are detected by a test and not loaded in the trolley and outputs the trolley ID to the trolley information reading unit 31 and the number of defective parts that are detected by a test and not loaded in the trolley to the production line detecting unit 32 (step S1501). Here, parts can be classified into non-defective parts and defective parts by a test unit provided in the output port of each processing line, and the number of defective parts is the total number of parts that are detected to be defective parts and cannot be loaded in the trolley. The above-described number of loaded parts is a counted number of a counter which is received by the mobile terminal 5 and is the number of parts in the trolley detected by the operator.

The production line detecting unit 32 changes the line cycle table 22 and the "line cycle"-"line output port" table 26 in correspondence with the change of the location code and registers history in the "part"-"location change history" table 29 (step S1502, this process will be described later in more details).

Then, the production line detecting unit 32 reads out a location code corresponding to the location tag ID read from the "location"-"location tag" table 20, searches the "line"-"location" table 21 by using the location code, and reads out line information (a line code of the processing line, an input port location code, an output port location code, the number of types of input parts, etc.) corresponding to the location code. In addition, the trolley information reading unit 31 reads out a trolley code and a part number (trolley information) corresponding to the trolley ID from the trolley current information table 28 (step S1503).

Next, the line cycle management unit 33 reads out a line cycle number of a currently operated line cycle corresponding to the line code of the line information, from the line cycle table 22. In addition, the loading linking unit 44 reads out an input lot number corresponding to the line cycle number from the "line cycle"-"processing line input port" table 24, reads out a part number in the input port side of a production line corresponding to the lot number from the "lot"-"trolley"-"part" table 23, and acquires a part number (input part number) in the output port of the production line corresponding to the part number (loading part number) read-out in the input port side (step S1504, the same as the process shown in the flowchart of FIG. 20).

Next, the line cycle management unit 33 detects whether the number of parts currently loaded in the loading trolley is "0". While the process proceeds to step S1506 when it is detected that the number of the loaded parts is "0", the process proceeds to step S1511 when it is determined that the number of the loaded parts is not "0" (step S1505).

When detecting that the number of the loaded parts is not "0", for additional loading of a part, the line cycle management unit 33 detects whether the part number of a part loaded in the trolley currently in a loading process, that is, the part number of a part, which has been loaded, read-out from the trolley current information table 28 is identical to the part number of a part to be loaded. When the line cycle management unit 33 detects that the above-described part numbers are identical, the process proceeds to step S1506, and when the line cycle management unit 33 detects that the above-described part numbers are not identical, the process proceeds to step S1512 (step S1511). Here, the part number of the part to be loaded is the part number of a loading part acquired in step S1504.

When detecting that the part numbers are not identical in step S1511, the line cycle management unit 33 outputs notification of an error to the operator, for example, an error message indicating "a part having a different part number is loaded" to the mobile terminal 5 (step S1512).

Next, the line cycle management unit 33 writes the input port location code of the processing line as the location code, the input part number as the part number, and writes a number resulting from adding the number of loaded parts and the number of defective parts to the number of normal unloaded parts in the "part"-"location change history" table 29 in correspondence with the newly acquired change history number, as history of the moving origin. In addition, the line cycle management unit 33 writes the output port location code of the processing line as the location code, the loading part number as the part number, and writes a number resulting from adding the number of loaded parts and the number of defective parts to the number of normal loaded parts in the "part"-"location change history" table 29 in correspondence with the newly acquired change history number, as history of the moved site (step S1506).

Next, the line cycle management unit 33 detects whether the number of parts currently loaded in the loading trolley is "0". While the process proceeds to step S1508 when it is detected that the number of the loaded parts is "0", the process proceeds to step S1510 when it is detected that the number of the loaded parts is not "0" (step S1507). Here, when the number of loaded parts in the trolley is "0", the trolley is a new trolley in which a part is not loaded. On the other hand, when the number of loaded parts in the trolley is other than "0", the trolley is a trolley in a status in which a part has been already loaded for additional loading.

Next, the lot linking unit 34, extracts a loading lot number having the largest serial number from line code_year/month/date_serial number having a corresponding line code and year/month/date in the "line cycle"-"output port" table 26 and sets a new loading lot number (new lot number) as a number generated from adding "1" to the loading lot number (step S1508). Furthermore, it may be configured that loading lot numbers corresponding to the input lot numbers are configured as a table and a loading lot number corresponding to the input lot is read-out.

Then, the lot linking unit 34 reads out a trolley code corresponding to the trolley ID from the trolley current information table 28, writes the trolley code of the loading trolley into the "lot"-"trolley"-"part" table 23 while being linked with the newly acquired loading lot number, and writes the loading part number as the part number for registration (step S1509).

Next, the line cycle management unit 33 updates data in the trolley current information table 28 by writing a location code indicating locations of the trolley corresponding to the trolley code and part numbers of the parts loaded into the trolley, lot numbers of the parts, and the number of currently loaded parts that is the number of parts currently loaded in the trolley into the trolley current information table 28 for each trolley code (step S1510). Here, the line cycle management unit 33 adds the number of loaded parts received from the mobile terminal 5 to the number of currently loaded parts for acquiring a new number of loaded parts and updates the trolley current information table 28 by overwriting the new number of loaded parts.

Then, the line cycle management unit 33 updates the data in the line cycle table 22 by writing a loaded number as the number of non-defective parts and the number of defective parts as the number of defective parts, in correspondence with the line cycle number into the line cycle table 22 (step S1513).

Then, the line cycle management unit 33 reads out trolley information (a location code, a part number, a trolley ID, a current number of loaded parts, etc.) corresponding to the trolley code from the trolley current information table 28 (step S1514).

Next, the lot linking unit 34 updates the data in the "line cycle"-"line output port" table 26 by writing the loading lot number and update date/time acquired in step S1508 in correspondence with the line cycle number into the "line cycle"-"line output port" table 26 (S1515). Accordingly, in the "line cycle"-"processing line input port" table 24 and the "line cycle"-"line output port" table 26, the input lot numbers (parent lot numbers) and the loading lot number are corresponded to each other through the line cycle numbers, and a linking operation between the parent lot numbers and the child lot numbers is performed.

Next, the line cycle management unit 33 reads out the line cycle information in correspondence with the line cycle number form the line cycle table 22 (step S1516).

Then, the line cycle management unit 33 outputs the read latest line cycle information and trolley information (step S1517).

As described above, in the flowchart shown in FIG. 18, the lot linking unit 34 performs a process of linking to a line cycle number by changing a part number of a part input into the production line to a part number of a processed part output from the production line.

The lot linking unit 34, as a process for management of part numbers, performs a process of history management of part production in a part loading operation of a trolley for a processing line or assembly line by reading out a loading part number corresponding to an input part number from the part linking table 27, linking the loading part number to a trolley code and a location code, and writing the loading part number linked with the trolley code and the location code into the "part"-"location change history" table 29 after a processing or assembly process.

Then, the lot linking unit 34 reads out a lot number corresponding to the line cycle number included in the line cycle information from the "line cycle"-"processing line input port" table 24 or the "line cycle"-"assembly line input port" table 25 and then, reads out an input part number corresponding to the read lot number from the trolley current information table 28.

Then, the lot linking unit 34 reads out a loading part number corresponding to the input part number from the part linking table 27 configured in advance and stores the read loading part number together with a location code (a location code of the output port side of the production line) and the number of currently loaded parts into the trolley current information table 28 while being linked with the loading trolley code.

In the above-described process of the lot linking unit 34, in step S1505, when the number of currently loaded parts is "0", a new loading operation is started, and accordingly the process proceeds to step S1506. On the other hand, when the number of currently loaded parts is not "0", loading of parts into the trolley is required to be checked, and accordingly it is required that the lot linking unit 34 reads out a part number of the part loaded finally from the trolley current information table 28 using the trolley code and determines whether the part number is identical to a part number to be loaded in step S1511.

Then, the lot linking unit 34 performs a registration process for the "part"-"location change history" table 29 and acquires the number of currently loaded parts of the loading trolley by referring to the trolley current information table 28 using the loading trolley code when a loading process is newly started. When the number of the currently loaded parts is detected to be "0" in step S1507, the lot linking unit 34 acquires a loading lot number for loading a new part and stores the loading lot number in the trolley current information table 28 while being linked with a loading trolley code of the loading trolley. On the other hand, when the number of the currently loaded parts is detected to be not "0", the lot linking unit 34 updates the number of the currently loaded parts in the trolley current information table 28.

In other words, when the lot linking unit 34 performs a loading process for a trolley, if the number of the currently loaded parts is "0", a new loading process of processed parts into the trolley in the production line is started, and accordingly, in step S1508, it is required to acquire a new loading lot number linked with the trolley code.

Hereinafter, a process (step S1502) of changing locations shown in the flowchart of FIG. 18 will be described in more details with reference to a flowchart shown in FIG. 19. This process is performed when a trolley moves, that is, location of a trolley changes.

As shown in the flowchart of FIG. 18, if a trolley is moved, when receiving a location tag ID and a trolley IF from the mobile terminal 5, the transmission/reception unit 36 of the parts processing management server 1 outputs the location tag ID to the production line detecting unit 32 and the trolley ID to the trolley information reading unit 31.

Figure 19:
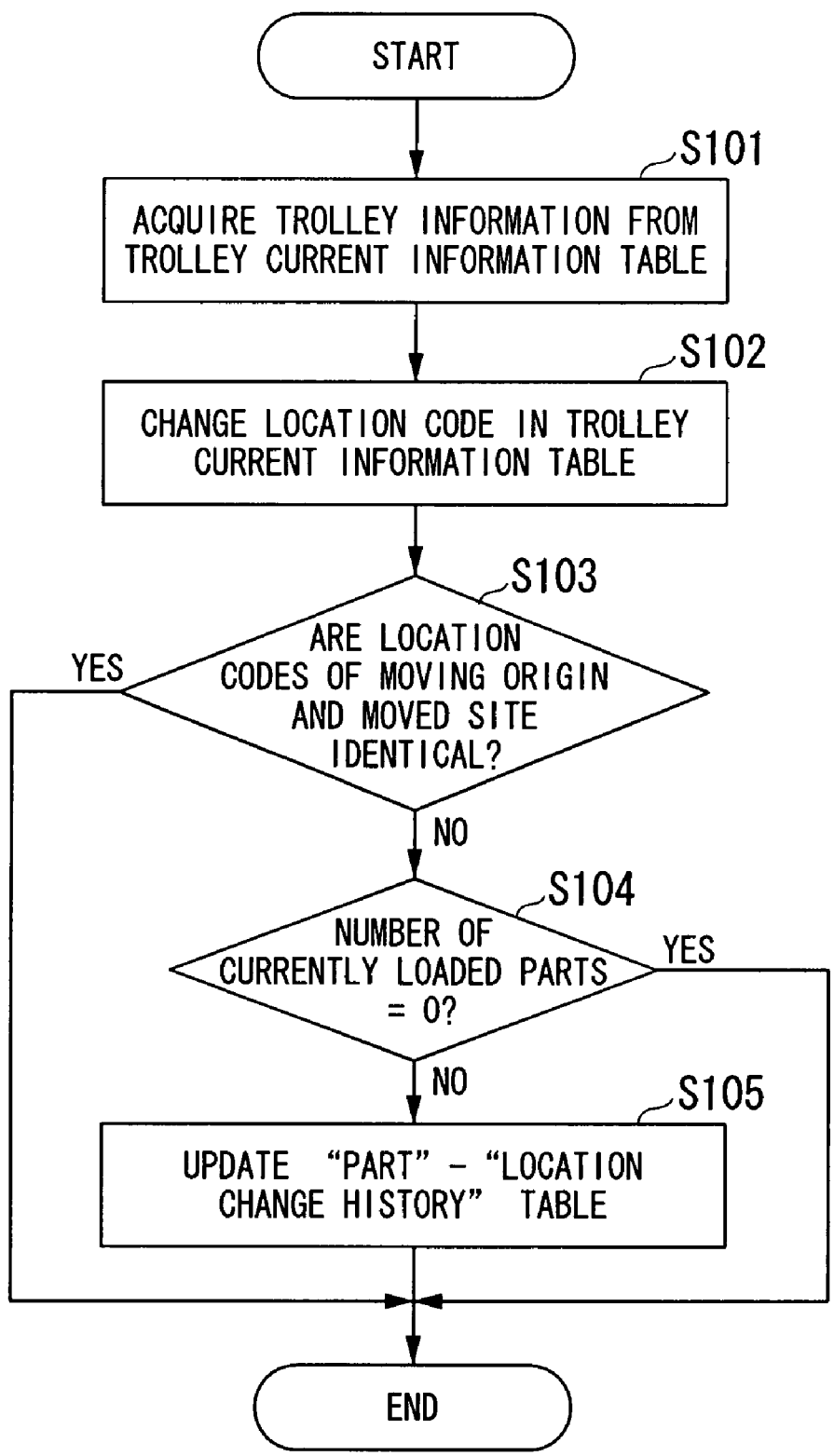
FIG. 19 is a flowchart showing a process of changing locations of a trolley in step S1502 of the flowchart shown in FIG. 18, as an example.

In the flowchart shown in FIG. 19, the production line detecting unit 32 reads out a location code corresponding to the input location tag ID from the "location-location tag" table 20 in the process for changing locations. Here, the production line detecting unit 32 reads out the location code as a location code of a moving origin. In addition, the trolley information reading unit 31 reads out a trolley code and a part number (trolley information) corresponding to the trolley ID from the trolley current information table 28 (step S101).

Then, the production line detecting unit 32 changes the location code corresponding to the trolley code of the trolley 100 from a location code representing a resource storage site as the moving origin to a location code (the location code sent from the mobile terminal 5 by the operator) representing the input port of a processing line L as a moved site in the trolley current information table 28 (step S102). Here, when the location codes are changed as described above, the production line detecting unit 32 overwrites an initially written location code with a location code (the location code of the moved site) corresponding to the location tag ID received from the mobile terminal 5.

Then, the production line detecting unit 32 compares the location code of the moving origin with the location code of the moved site, whereby determining whether they are identical (step S103).

When the production line detecting unit 32 determines that the location codes of the moving origin and the moved site are identical, the trolley is not moved substantially, and accordingly, the process thereafter is not processed, and the routine for the process of changing the locations ends.

On the other hand, when the production line detecting unit 32 determines that the location codes of the moving origin and the moved site are not identical, the trolley is moved to a new location, and accordingly, the process proceeds to step S104.

Then, the production line detecting unit 32 reads out the number of currently loaded parts corresponding to the trolley code from the trolley current information table 28 and determines whether the number of currently loaded parts is "0" (step S1104).

When the production line detecting unit 32 detects that the number of currently loaded parts is "0", there is no part for being input to the trolley (for example, when an input operation of a part for a processing line is completed), and accordingly, the process thereafter is not performed and the routine for the process of changing the locations ends.

On the other hand, when the production line detecting unit 32 detects that the number of currently loaded parts is not "0", there is a part for being input to the trolley (for example, when an input operation of a part for a processing line is continued), and accordingly, the process proceeds to step S105.

Then, the production line detecting unit 32 changes data corresponding to the trolley code in the "part"-"location change history" table 29 (step S105). Here, the production line detecting unit 32 rewrites data as described below in accordance with a first condition in which a location code of the moved site represents the input port of the assembly line or the final assembly line, a second condition in which a location of the moved site is an intermediate inventory storage site and a location code of the moving origin represents the input port of the assembly line, and a third condition other than the first and second conditions.

Case in which First Condition is Satisfied

The production line detecting unit 32, as the history of the moving origin, registers change history data in the "part"-"location change history" table 29 corresponding to the newly acquired change history number by writing the location code of the moving origin as a location code, the part number read in step S101 as a part number, and the number of currently loaded parts read in step S102 as the number of normally unloaded parts into the "part"-"location change history" table 29. In addition, the production line detecting unit 32, as the history of the moved site, registers the change history data corresponding to the newly acquired change history number by writing the location code of the moved site as a location code, the part number read in step S101 as a part number, and the number of currently loaded parts read in step S102 as the number of normally loaded parts.

Case in which Second Condition is Satisfied

The production line detecting unit 32 writes the location code of the moving origin as the location code, the part number read in step S101 as the part number, and a value resulting from changing the sign of the number of currently loaded parts read in step S102 into negative as the number of normally loaded parts in the "part"-"location change history" table 29 in correspondence with the newly acquired change history number, as history of the moving origin, for registering data of change history. In addition, the production line detecting unit 32 writes the location code of the moved site as the location code, the part number read in step S101 as the part number, and a value resulting from changing the sign of the number of currently loaded parts read in step S102 into negative as the number of normally unloaded parts in the "part"-"location change history" table 29 in correspondence with the newly acquired change history number, as history of the moved site, for registering data of change history.

Case in which Third Condition is Satisfied

The production line detecting unit 32 writes the location code of the moving origin as the location code, the part number read in step S101 as the part number, and the number of currently loaded parts read in step S102 as the number of unloaded inventories in the "part"-"location change history" table 29 in correspondence with the newly acquired change history number, as the history of the moving origin, for registering data of change history. In addition, the production line detecting unit 32 writes the location code of the moved site as the location code, the part number read in step S101 as the part number, and the number of currently loaded parts read in step S102 as the number of loaded inventories in the "part"-"location change history" table 29 in correspondence with the newly acquired change history number, as the history of the moved site, for registering data of change history.

When completing the process of changing the location codes for the moving origin and the moved site, the production line detecting unit 32 ends the routine for the process of changing locations.

Figure 20:
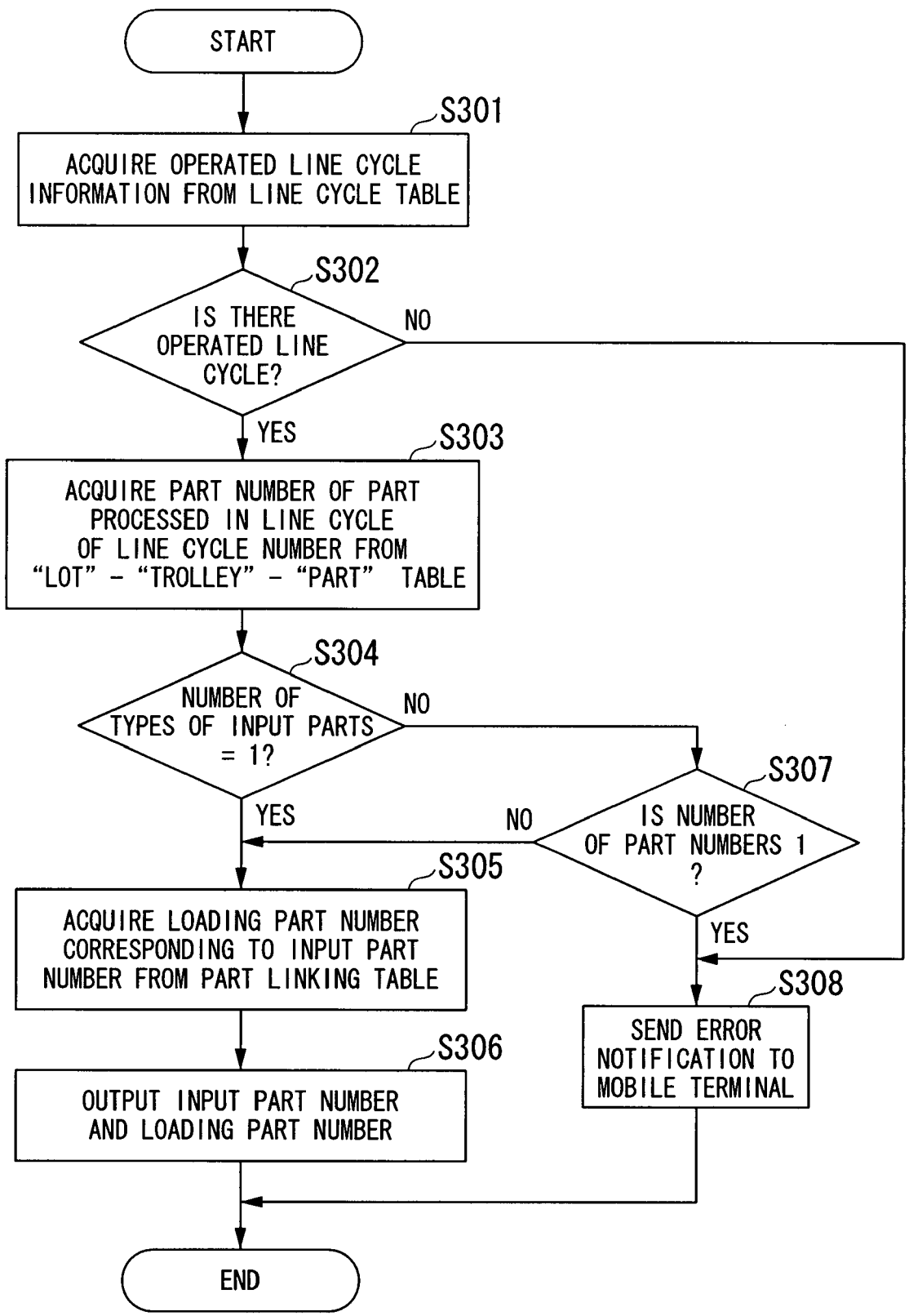
FIG. 20 is a flowchart showing a process of acquiring part numbers before and after inputting parts in step S1504 of a flowchart shown in FIG. 18.

Hereinafter, a process of acquiring a part number before/after step S1504 in the flowchart shown in FIG. 18 will be described in more details with reference to a flowchart shown in FIG. 20. In the flowchart shown in FIG. 20, it is assumed that the number of types of parts for the assembly line is two.

The line cycle management unit 33 reads out information on currently operated line cycles corresponding to the line code of the production line from the line cycle table 22 (step S301).

Then, the line cycle management unit 33 detects whether a line cycle number of a operated line cycle is read in step S301, that is, whether there is a operated line cycle. When the line cycle management unit 33 detects a operated line cycle, the process proceeds to step S303. On the other hand, when the line cycle management unit 33 detects no operated line cycle, the process proceeds to step S308 (step S302).

Next, the lot linking unit 34 reads out a lot number (order slip number: input lot number) corresponding to the line cycle number read in step S301 from the "line cycle"-"processing line input port" table 24 and then, reads out a part number corresponding to the lot number from the "lot"-"trolley"-"part" table 23 (step S303).

The lot linking unit 34 detects whether the read number of types of input parts corresponding to the input location code from the "line"-"location" table 21 is "1". When the lot linking unit 34 detects that the number of types of input parts is "1" (for a processing line), the process proceeds to step S305.

On the other hand, when the lot linking unit 34 detects that the number of types of input parts is not "1" (for an assembly line), the process proceeds to step S307 (step S304).

When the lot linking unit 34 detects that the number of types of input parts is not "1", the following process is performed. The lot linking unit 34 counts the part numbers read from the trolley current information table 28 in correspondence with the trolley code received from the mobile terminal 5 as the number of part numbers of input parts and then, detects whether the counted number of the part numbers is "1", that is, whether the same number of part numbers as the number of types of the input parts is input. When the lot linking unit 34 detects that the counted part number is "1" (the number of types of parts required for the assembly, it is detected that two parts are not input in FIG. 20), the process proceeds to step S308. On the other hand, when the lot linking unit 34 detects that the counted part number is not "1" (detecting that the number of types of parts required for the assembly is input), the process proceeds to step S305 (step S307).

Then, the lot linking unit 34 reads out a loading part number (a part number after input) corresponding to the input part number (a part number before input) from the part linking table 27 (step S305) and outputs the loading part number (step S306). Here, in an assembly line for assembling one part from a plurality of parts, input part numbers (part numbers for each part) and a loading part number (one for an assembled parts) are set in advance for each of the plurality parts.

Here, in the part linking table 27, names of loading parts corresponding to the loading part numbers are recorded. The line cycle management unit 33 may reads/outputs the name of the loading part together with the loading part number.

When a operated line cycle is not detected in step S302 or only one part number is detected in step S307, the part linking table 27 determines that an error occurs and sends an error message of "The input part number cannot be acquired" or "The number of input parts is insufficient" to the mobile terminal 5.

Figure 21:
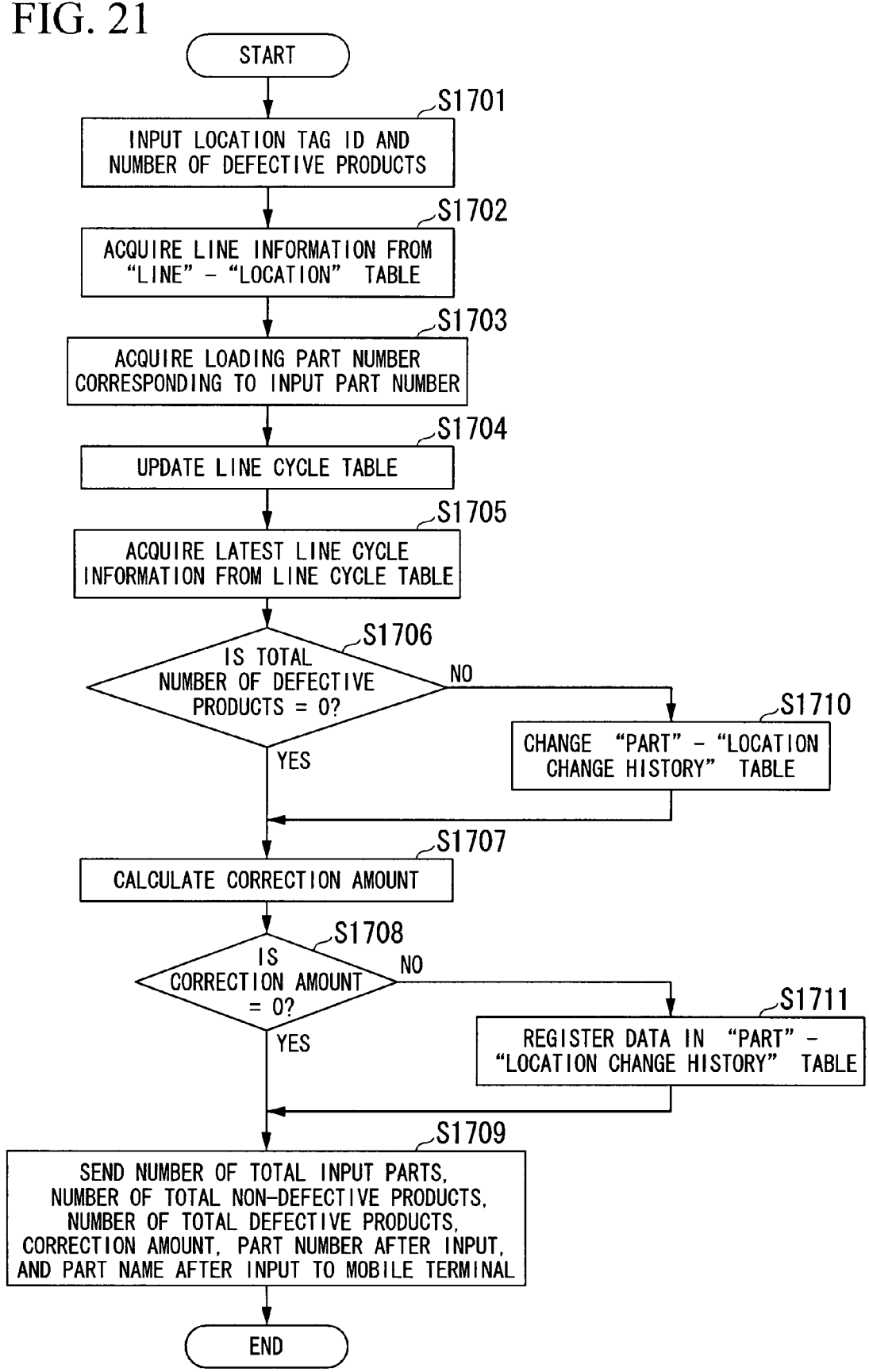
FIG. 21 is a flowchart showing a process of completing the processing of parts in a production line performed by a parts processing management server 1 according to an embodiment of the invention, as an example.

Next, a routine for a process of ending a processing operation shown in a flowchart of FIG. 21 is performed in the parts processing management server 1 in accordance with completion of the line cycle in the processing line in step S5. FIG. 21 is a flowchart showing a process of completing the processing of parts according to the embodiment of the invention.

The transmission/reception unit 36 receives the location tag ID and the number of defective products that are sent from the mobile terminal 5 by the operator and outputs the received data to the production line detecting unit 32 (step S1701). Here, parts are classified into non-defective parts and defective parts by a test unit disposed in the output port of each processing line, and the number of defective parts is the total number of defective parts in the line cycle.

Then, the production line detecting unit 32 reads out a location code corresponding to the location tag ID read from the "location"-"location tag" table 20, searches the "line"-"location" table 21 by using the location code, and reads out line information (a line code of the processing line, a location code of the input port, a location code of the output port, the number of input parts, etc.) corresponding to the location code (step S1702).

Next, the line cycle management unit 33 reads out a currently operated line cycle number corresponding to the line code included in the line information from the line cycle table 22 and outputs the line cycle number to the lot linking unit 34. In accordance with input of the line cycle number, the lot linking unit 34 reads out an input lot number corresponding to the line cycle number from the "line cycle"-"processing line input port" table 24, reads out a part number corresponding to the lot number from the "lot"-"trolley"-"part" table 23, and acquires a part number (loading part number) in the output port side corresponding to the read part number (input part number) in the input port side (step S1703, a process of a flowchart shown in FIG. 20).

Then, the line cycle management unit 33 performs a process of ending a line cycle corresponding to the above-described line cycle number (step S1704). Here, the line cycle management unit 33 performs an update process for the line cycle table 22 by writing the end date of the line cycle, the total number of defective parts into the line cycle table 22 in correspondence with the line cycle on the basis of the line cycle completion information input from the mobile terminal 5 through the transmission/reception unit 36.

Then, the line cycle management unit 33 reads out latest line cycle information corresponding to the above-described line cycle number from the line cycle table 22 (step S1705).

Then, the line cycle management unit 33 detects whether the total number of defective parts (the above-described total number of products classified into defective parts) is "0". While the process proceeds to step S1707 when the line cycle management unit 33 detects that the total number of defective parts is "0", the process proceeds to step S1710 when the line cycle management unit 33 detects that the total number of defective parts is not "0" (step S1706).

When detecting that the total number of defective parts is not "0", as a moving origin (the input port of the processing line as a location), the line cycle management unit 33 writes a location code (for example, a location code of the input port of the processing line L) of the moving origin into the "part"-"location change history" table 29 in correspondence with the part number (loading part number) and writes the total number of defective parts into the area of the number of normal unloaded parts. Then, the line cycle management unit 33 writes a location code (for example, the location code of the output port of the processing line L)) in the "part"-"location change history" table 29 in correspondence with the part number (loading part number) as a moved site (the location code of the output port of the processing line L) and writes the total number of defective parts into the area of the number of the defective parts, for the registration thereof, and the process proceeds to step S1707 (step S1710).

Next, the line cycle management unit 33 calculates a correction amount by summing the total number of non-defective parts and the total number of defective parts and subtracting a number calculated by dividing the total number of input parts by the number of types of input parts from the resultant summed value (step S1707). In other words, the line cycle management unit 33 acquires the correction amount by calculating (total number of non-defective parts+total number of defective parts)−(total number of input parts/the number of types of input parts).

Then, the line cycle management unit 33 detects whether the correction amount calculated in step S1707 is "0". While the process proceeds to step S1709 when the line cycle management unit 33 detects that the correction amount is "0", the process proceeds to step S1711 when the line cycle management unit 33 detects that the correction amount is not "0" (step S1708).

When detecting that the correction amount calculated is "0", the line cycle management unit 33 registers the correction amount in the "part"-"location change history" table 29 (step S1711). Here, the line cycle management unit 33 stores the part number, the location number of the moving origin (the location code of the input port of the processing line), and the correction amount in the "part"-"location change history"

table 29 in correspondence with the change history number for registration of the change history, and the process proceeds to step S1709.

Then, the line cycle management unit 33 sends the total number of input parts, the total number of non-defective parts, the total number of defective parts, the correction amount (difference in inventory figures), the part number after input, and the part name after input to the mobile terminal 5 (step S1709).

Figure 22:
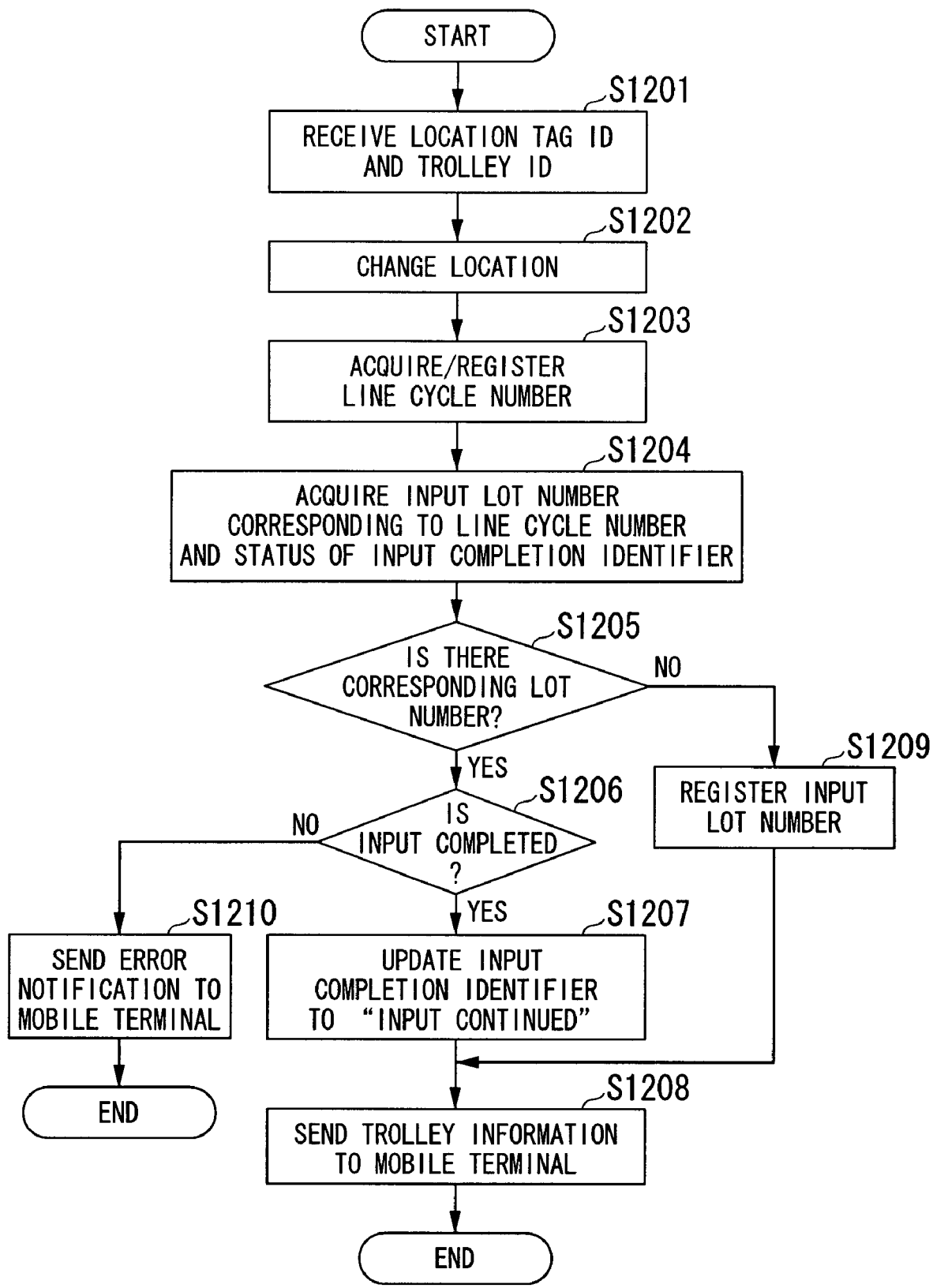
FIG. 22 is a flowchart showing a process of inputting parts into a production line (assembly line) performed by a parts processing management server 1 according to an embodiment of the invention, as an example.

Next, a routine for a process of starting input of parts shown in a flowchart of FIG. 22 is performed in the parts processing management server 1 in correspondence with the process of the operator in step S7 for a process of inputting parts to the assembly line. FIG. 22 is a flowchart showing a process of the inputting of parts to the assembly line as an example. Here, some trolleys move from a processing line in the previous stage, and other trolleys move to an intermediate inventory storage site.

The transmission/reception unit 36 receives the location tag ID that is sent from the mobile terminal 5 by the operator and trolley IDs read from IC tags T1 and T2 of the trolleys 102 and 103, and the numbers of input parts and outputs the location ID to the production line detecting unit 32 and the trolley IDs to the trolley information reading unit 31 (step S1201).

Next, the production line detecting unit 32 reads out a location code corresponding to the input location ID from the "location"-"location tag" table 20. In addition, the trolley information reading unit 31 reads trolley codes and part numbers (trolley information) corresponding to the trolley IDs from the trolley current information table 28. A process for changing locations is performed in accordance with the flowchart shown in FIG. 22, like step S1502 shown in FIG. 18 (step S1202).

The line cycle management unit 33 performs a process for registering/acquiring a line cycle number on the basis of a new location (here, the location code of the input port of the assembly line) in accordance with the flowchart shown in FIG. 16, like step S1103 (step S1203).

In the flowchart shown in FIG. 16, since the assembly line produces one part from a plurality of parts, a plurality of, two in the flowchart shown in FIG. 16, types of input parts are detected in step S208, and the line cycle management unit 33 searches for an input lot number corresponding to the line cycle number from the "line cycle"-"assembly line input port" table 25 in step S209. Then, part numbers corresponding to the input lot number are read-out from the "lot"-"trolley"-"part" table 23, and the part numbers are counted. Then, the resultant counted number of the part numbers is set as the number of the part numbers, and it is determined whether the number of the parts is one.

Next, the lot linking unit 34 searches the "line cycle"-"assembly line input port" table 25 by using the line cycle number and reads out an input lot number and input completion identifier corresponding to the line cycle number (step S11204).

While the process proceeds to step S11206 when the lot linking unit 34 detects that the input lot number corresponding to the line cycle number is written in step S1204, the process proceeds to step S1209 when the lot linking unit 34 detects that the input lot number corresponding to the line cycle number is not written (step S1205).

In step S1206, the lot linking unit 34 detects whether the read input completion identifier is "input completed" ("1") or "input continued" ("0"). While the process proceeds to step S1207 when the input completion identifier represents "input completed", the process proceeds to step S1210 when the input completion identifier represents "input continued".

When the input completion identifier represents "input completed", the lot linking unit 34 rewrites the input completion identifier from "1" to "0", that is, changes the input completion identifier from "input completed" to "input continued" and the process proceeds to step S1208 (step S1207). On the other hand, when detecting that the input completion identifier is "input continued", the lot linking unit 34 sends information for error notification indicating "the part has been already input and a process for starting an input operation is not required" to the mobile terminal 5 (step S1210).

When it is determined that the lot number is not written in step S1205, the lot linking unit 34 performs a process for data registration in the "line cycle"-"assembly line input port" table 25 by writing the input lot number corresponding to the line cycle number and writing the input completion identifier as "input continued" (step S1209). In other words, an operation for linking between the input lot number and the line cycle number is performed. At this moment, the lot linking unit 34, in consideration of traceability, in an assembly line for assembling one part from a plurality of parts, stores lot numbers of all the parts used for the assembly in the "line cycle"-"assembly line input port" table 25 in correspondence with the line cycle numbers.

Then, the lot linking unit 34 sends the trolley information updated (that is, updated in step S108 of FIG. 19) in step S1202 to the mobile terminal 5 through the transmission/reception unit 36 (step S1208). Here, the trolley information includes a location code, a part number, a trolley ID, and the number of currently loaded parts, which are written in the trolley current information table 28, corresponding to the trolley code.

Figure 23:
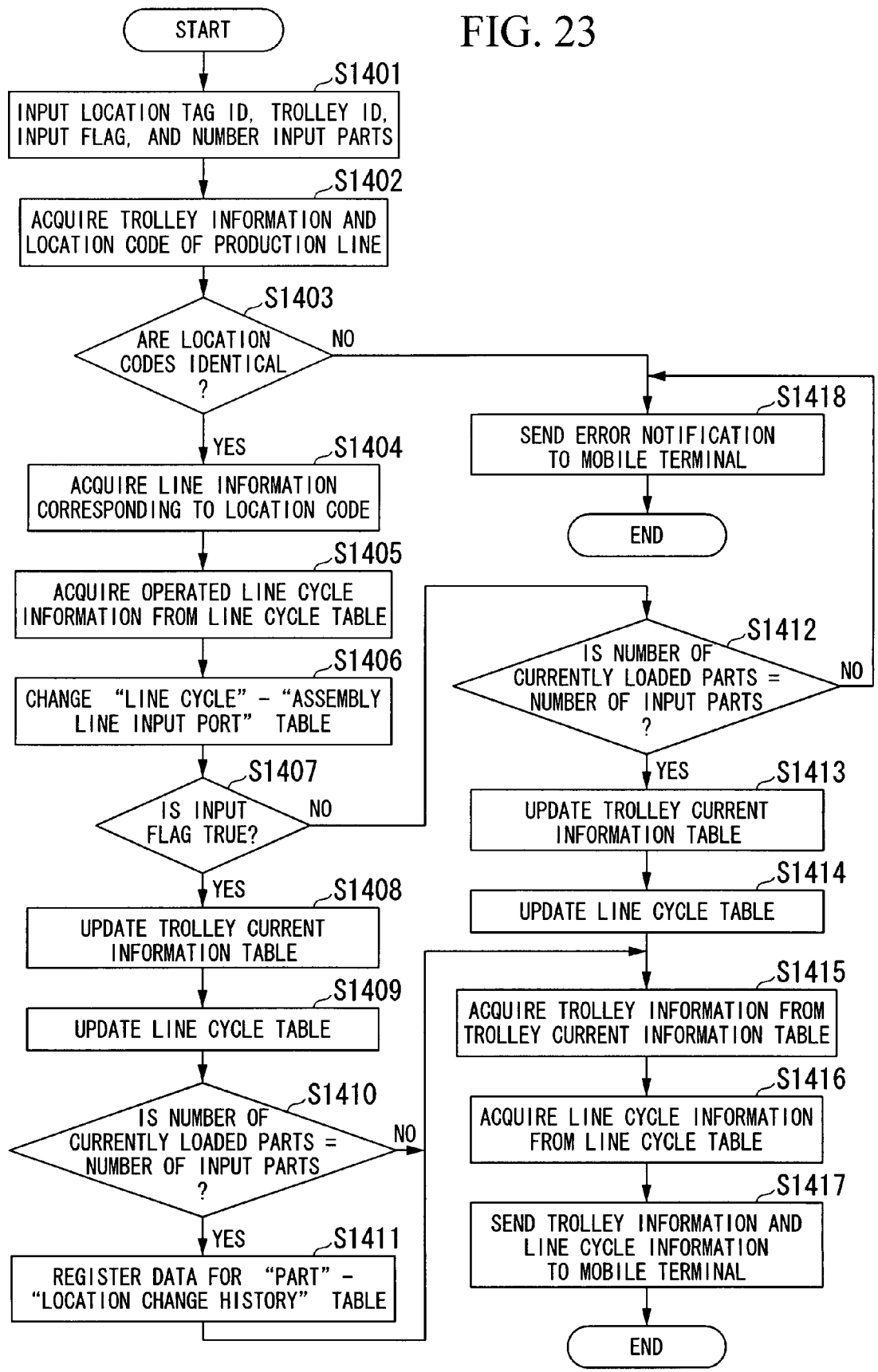
FIG. 23 is a flowchart showing a process of completing the inputting of parts into a production line (assembly line) performed by a parts processing management server 1 according to an embodiment of the invention.

Next, a routine for a process of ending input of parts to the assembly line shown in a flowchart of FIG. 23 is performed in the parts processing management server 1, in correspondence with the input process of the operator to the assembly line in step S8. FIG. 23 is a flowchart showing a process of completing the inputting of parts in the embodiment, as an example.

The transmission/reception unit 36 receives the location tag ID and the trolley ID which are sent from the mobile terminal 5 by the operator, the input flag indicating the completion of input of all the parts, and the number of input parts and outputs the received data to the trolley information reading unit 31 and the production line detecting unit 32 (step S1401). Here, the number of input parts is a number that is input to the mobile terminal 5 by the operator after reading the counting number of a counter disposed in the input port of each processing line or the counting number of the counter read by the mobile terminal 5 using wireless communication or the like.

Next, the production line detecting unit 32 reads out a location code corresponding to the input location tag ID from the "location"-"location tag" table 20. In addition, the trolley information reading unit 31 reads out trolley information (including a trolley code) corresponding to the trolley ID from the trolley current information table 28 (step S1402).

Then, the production line detecting unit 32 detects whether a location code corresponding to the location tag ID is identical to a location code included in the read trolley information. While the process proceeds to step S1404 when the location codes are identical, the process proceeds to step S1418 when the location codes are not identical (step S1403).

Then, the production line detecting unit 32 reads out line information corresponding to the location code (a location code corresponding to the received location tag ID) from the "line"-"location" table 21 (step S1404).

Then, the line cycle management unit 33 reads out line cycle information on the currently operated line cycle corresponding to the line code included in the line information from the line cycle table 22 (step S1405). Here, the line cycle management unit 33 detects the operated line cycle by detecting a line cycle number among line cycle numbers corresponding to the line code in which data for date/time of start of the line cycle is written and data for the end date of the line cycle is not written.

Then, the line cycle management unit 33 changes the input completion identifier of an order slip number (or an input lot number) in the "line cycle"-"assembly line input port" table 25 corresponding to the line cycle number included in the line cycle information from "input continued" ("0") to "input completed" ("1") (step S1406).

Next, the line cycle management unit 33 detects whether the input flag is "true" (all parts are input) or "false" (some parts are input) so as to rewrite the trolley current information table 28. While the process proceeds to step S1408 when the line cycle management unit 33 detects the input flag to be "true", the process proceeds to step S1412 when the line cycle management unit 33 detects the input flag to be "false" (step S1407).

When detecting the input flag to be "true", the line cycle management unit 33 clears data in the trolley current information table 28 corresponding to the trolley code. Here, the line cycle management unit 33 updates data by writing a location code corresponding to the received location tag ID in the trolley current information table 28 as the location code corresponding to the trolley code, writing "0" as the number of currently loaded parts, and writing "NULL" (undetermined status) as the part number and the lot number (step S1408).

Next, the line cycle management unit 33 updates data of the line cycle table 22 by adding the total number of input parts corresponding to the line cycle number (that is, the line cycle number indicating currently operated line cycle) read in step S1405 to the number of input parts input from the mobile terminal 5 (step S1409).

Then, the line cycle management unit 33 detects whether the number of currently loaded parts included in the trolley information and the number of input parts input from the mobile terminal 5 are identical. While the process proceeds to step S1415 when the line cycle management unit 33 detects that the number of currently loaded parts and the number of input parts are identical, the process proceeds to step S1411 when the line cycle management unit 33 detects that the number of currently loaded parts and the number of input parts are not identical (step S1410).

When detecting that the number of currently loaded parts and the number of input parts are not identical in step S1410, the line cycle management unit 33 performs registration of history data in the "part"-"location change history" table 29 in correspondence with a newly acquired change history number as history of a moving site by writing a location code corresponding to the input location tag ID input from the mobile terminal 5, writes the part number included in the trolley information as a part number, and writes a number generated from subtracting the number of currently loaded parts included in the trolley information read in step S1402 from the number of input parts in the "part"-"location change history" table 29 (step S1411).

When detecting that the input flag is "false" in step S1407, the line cycle management unit 33 detects whether the number of currently loaded parts in the trolley information is equal to or greater than the number of input parts input from the mobile terminal 5. Wile the process proceeds to step S1413 when the number of currently loaded parts is equal to or greater than the number of input parts, the process proceeds to step S1418 when the number of currently loaded parts is smaller than the number of input parts (step S1412).

When the number of currently loaded parts is equal to the number of input parts, the line cycle management unit 33 performs a clear process of the trolley current information table 28, that is, writing a location code corresponding to the location tag ID as a location code corresponding to the trolley code, writes "0" as the number of currently loaded parts, and writes "NULL" (undefined status) as a part number and a lot number in the trolley current information table 28 for updating data thereof. On the other hand, when the number of currently loaded parts is greater than the number of input parts, the line cycle management unit 33 performs an update process of data in the trolley current information table 28 by writing a number generated from subtracting the number of input parts from the number of currently loaded parts included in the trolley information read in step S1402 as the number of currently loaded parts corresponding to the trolley code (step S1413).

Next, the line cycle management unit 33 performs an updating process of data in the line cycle table 22 by rewriting the number of input parts input from the mobile terminal 5 as the total number of input parts corresponding to the line cycle number read in step S1405 (step S1414).

Then, the line cycle management unit 33 reads out trolley information corresponding to the trolley code from the trolley current information table 28 (step S1415).

Next, the line cycle management unit 33 reads out line cycle information corresponding to the line cycle number from the line cycle table 22 (step S1416).

Then, the line cycle management unit 33 sends the trolley information read in step S11415 and the line cycle information read in step S11416 to the mobile terminal 5 through the transmission/reception unit 36 (step S1417). Here, when the trolley current information table 28 is cleared in step S1408 or S1413, the line cycle management unit 33 sends the trolley information before the clear process that has been read out in step S1402.

Next, a routine for a process in the parts processing management server 1 is performed when the line cycle ends, which is shown in the flowchart of above-described FIG. 21, in correspondence with completion of the process for assembling a plurality of parts, that is, end of the line cycle after the process of the parts processing management server 1 corresponding to the process of ending loading of the trolley in the assembly line of step S9 which is shown in the flowchart shown in FIG. 18. FIG. 21 is a flowchart showing a process of completing the assembling according to the embodiment, as an example.

Next, the parts processing management server 1 performs a process accompanied by move of the trolley 104 to the final assembly line corresponding to step S10. Here, there are a case in which the trolley moves from an assembly line to the final assembly line and a case in which the trolley moves from an assembly line to the inventory storage site. The process for the move of the trolley to the inventory storage site is the same as the above-described process for the move of the trolley from a processing line to the intermediate inventory storage site.

A process of assembly management performed by the parts processing management server 1 in the final assembly line is different from the process in the above-described production line or assembly line. In the process of assembly management in the final assembly line, a lot number is not linked through a line cycle number but is directly linked with a product number. In other words, in the final assembly line, since a product number is assigned to each product and the product numbers are linked with the input lot numbers, assembly parts used for the assembly or lot numbers of the parts are linked with each product (each one product). Accordingly, the lot linking unit 34 writes the input lot numbers of the assembly parts used for the assembly or the parts, for example, into a product number table while being linked with each product number.

Figure 24:
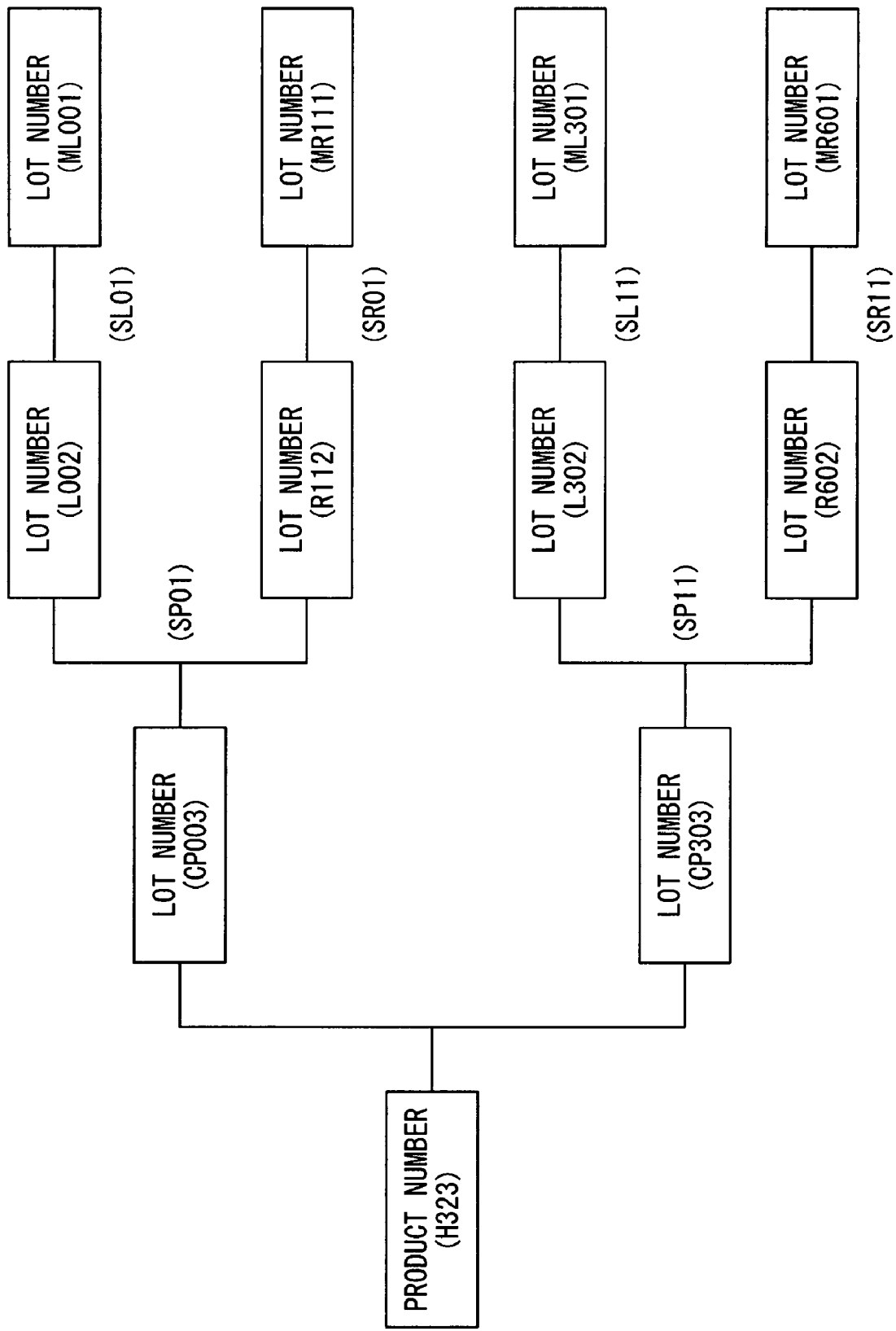
FIG. 24 is a schematic diagram showing a tree structure between lots of parts forming a product, for illustrating an operation of a search unit 35 according to an embodiment of the invention.

Hereinafter, a history management process that is traceability according to the embodiment will be described with reference to FIG. 24. FIG. 24 is a schematic diagram of a display screen showing correspondence between lot numbers linked by the parts processing management server 1.

When checking the processing and assembly history of parts of each product, in an image display unit (not shown) provided in the parts processing management server 1, the operator writes a product number into a product number entry field displayed in the display screen and clicks a history search starting button, so that the parts processing management server 1 searches product history corresponding to the product number.

As described above, when the operator, for example, performs an operation for starting the history searching for the product of product number H323, the search unit 35 of the parts processing management server 1 shown in FIG. 14 reads out input lot numbers CP003 and CP303 corresponding to product number H323 from the product number table.

Here, as shown in FIG. 24, the product number in the final assembly line is linked with the lot numbers of assembly parts assigned by the assembly line, whereby it can be checked visually from assembly parts of which lot a product is assembled from a tree structure.

Similarly, as shown in FIG. 24, a lot number CP003 assigned to an assembled part that has assembled in an assembly line and lot numbers L002 and R112 of parts used for assembling the assembled part are linked by a link cycle number SP01 specifying a line cycle in the assembly line that has assembled the child lot CP003 from the parts of parent lots L002 and R112, whereby it can be checked from parts of which lot the assembled part is assembled.

Similarly, as shown in FIG. 24, a lot number L002 assigned to a processed part that has processed in a processing line and a lot number (order slip number) ML001 of materials used for the materials that have been processed are linked by using a link cycle number SL01 specifying a line cycle in the assembly line L that has assembled by processing the child lot L002 from a material of the parent lot ML001 the, whereby it can be checked from parts of which lot the part is produced.

When the operator designates a lot number by clicking a lot number in the display screen or the like, the search unit 35 displays information on a part corresponding to the designated lot number in the display screen using the "lot"-"trolley"-"part" table 23.

For example, when the operator designates a lot number of a material, the search unit 35 reads out an order information corresponding to the designated lot number (order slip number) from the supplier order table 30 and displays the order information on the display screen.

Furthermore, the search unit 35 may read out line cycle information from the line cycle table 22 in correspondence with the designated lot number and display time information (start date of the line cycle and end date of the line cycle) at which the process is performed or yields (total number of input parts and total number of non-defective parts) of the process on the display screen.

Accordingly, the operator can check the production line status when parts of lots or an assembled part is produced by using the history information.

Figure 25:
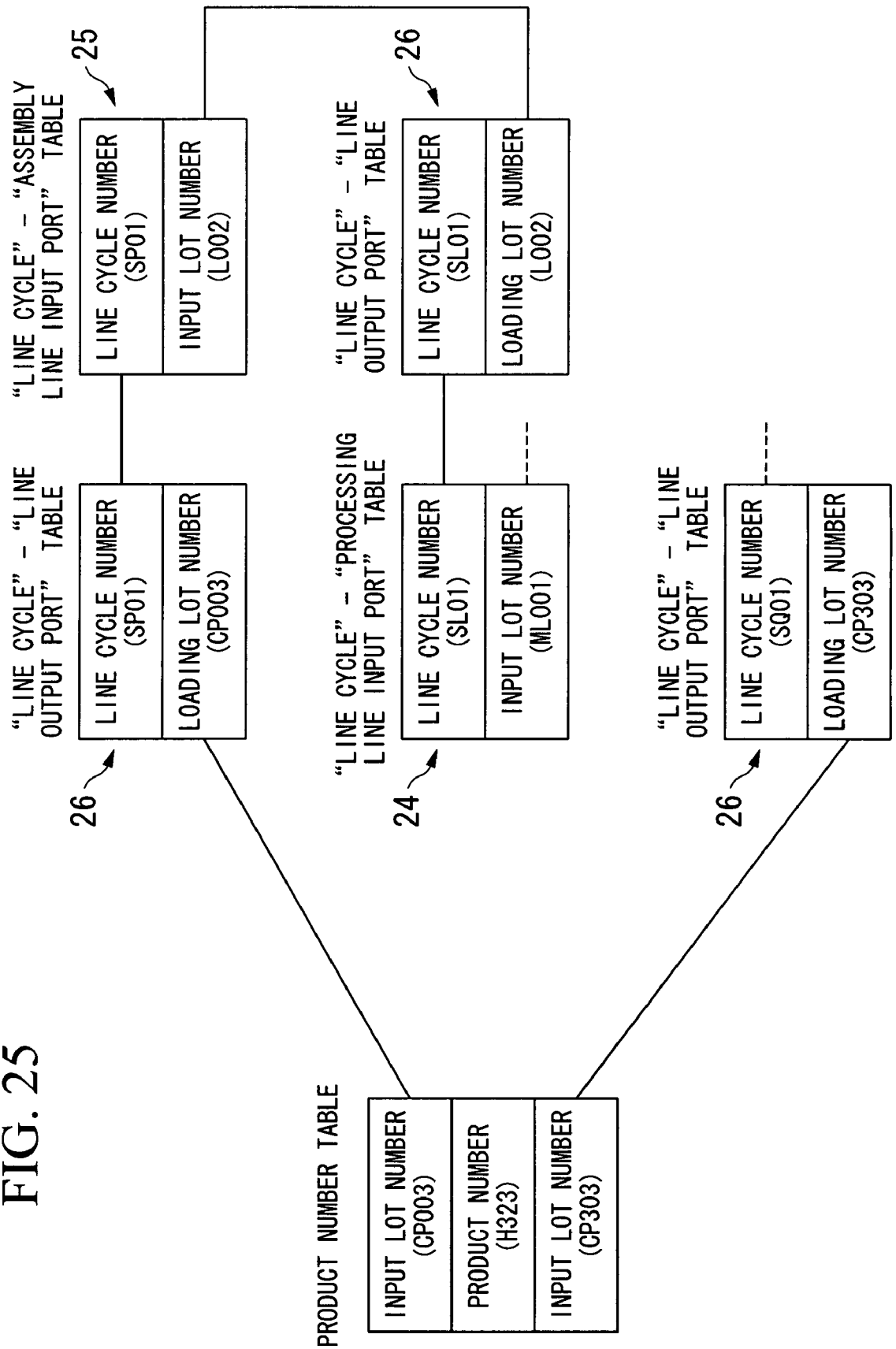
FIG. 25 is a schematic diagram showing the linking relationship between a "line cycle"-"line input port" table and a "line cycle"-"line output port" table, for illustrating an operation of a search unit 35 according to an embodiment of the invention.

As shown in FIG. 25, a loading lot number of a product as a result of production or a part and an input lot number of a material or a part for a processing or assembling process are related to each other by being linked with each other in a production line by using a line cycle number of the "line cycle"-"line output port" table 26 and the "line cycle"-"processing line input port" table 24 (or the "line cycle"-"assembly line input port" table 25). Among the production lines, a loading lot number of a production line in the previous-stage becomes an input lot number for the next stage, whereby the loading lot number and the input lot number in the next stage are corresponded as a same number.

As described above, by linking from a parent lot to a child lot in a production line using a line cycle number of each production line in which a part is processed from a material, an assembled part is assembled from a plurality of parts, and a final product is produced by assembling the assembled parts, it is possible to link a material, a part, an assembled part, and a product in an easy manner.

Thus, according to the above-described embodiment, it is possible to specify lot numbers of all the assembled parts constructing a product, parts, and materials by designating the product.

In the parts processing management server 1 according to the embodiment, as shown in FIG. 2, an inventory management unit 4 performing an inventory management process for the parts and assembled parts in each location is provided.

When the operator inputs the name of a location to the parts processing management server 1 as a search condition, the inventory management unit 4 reads out a location code corresponding to the input name of the location from a table in which names of locations and location codes representing the names of the location are linked.

Then, the inventory management unit 4 reads out change history numbers corresponding to the designated location code from the "part"-"location change history" table 29, selects the latest change history number among the change history numbers, reads out information in a table corresponding to the change history number, and displays the information on the display screen in the form of a table as shown in FIG. 26. Here, when the operator inputs a specific date, the inventory management unit 4 searches/reads the latest change history numbers equal or prior to the input date.

FIG. 26 shows an image displayed by the inventory management unit 4 when the operator inputs a specific data and selects all the locations.

As described above, according to the embodiment, not only the inventories at the intermediate storage site or inventory storage site but also inventories at the input and output ports of each production line are displayed on the display screen for each location by searching the "part"-"location-change history" table 29, which is performed by the inventory management unit 4, using a location code, whereby the operator can check all the inventories at each production line and the inventory storage site in a real time.

A program for implementing functions of the constituent units of the parts processing management server 1 shown in FIG. 2 may be recorded in a computer-readable medium, and a process of parts production management may be performed by loading the program recorded in the recording medium into a computer system and executing the program. Here, "computer system" includes an OS and hardware such as a peripheral device. Furthermore, the "computer system" includes a WWW system having a home page providing environment (or display environment). The "computer-readable recording medium" is a storage device such as a portable medium including a flexible disc, an optical-magnetic disc, a ROM, and a CD-ROM and a hard disk built in the computer system. Furthermore, the "computer-readable recording medium" includes a device storing a program for a predetermined time such as a volatile memory device (RAM) inside the computer system that becomes a server or a client in a case in which the program is transmitted through a network such as the Internet or a communication line such as a telephone line.

Furthermore, the program may be transmitted to other computer systems from the computer system in which the program is loaded in a memory device or the like through a transmission medium or carrier waves in a transmission medium. Here, the "transmission medium" means a medium having a function of information transmission such as a network (communication network) including the Internet or a communication line (communication wire) such as a telephone line. Furthermore, the program may implement a part of the above-described functions. The program may be a differential file (differential program) that may be combined with a program recorded in a computer system in advance.

While a preferred embodiment of the invention has been described and illustrated above, it should be understood that this is an exemplary of the invention and is not to be considered as limiting. Additions, omissions and substitutions, and other modifications can be made without departing from the spirit or scope of the present invention. Accordingly, the invention is not to be considered as being limited by the foregoing description, and is only limited by the scope of the appended claims.

What is claimed is:

1. A parts production management system that sets a linking relationship between a parent lot number at an input port of a part producing production line and a child lot number at an output port of the production line, the parts production management system comprising:

a first table in which a line cycle number representing a line cycle for processing a group of parts and a parent lot number of a part input for being processed in the line cycle represented by the line cycle number are stored while being linked together;

a second table in which the line cycle number and a child lot number of the part processed in the line cycle represented by the line cycle number are stored while being linked together;

a lot linking unit that stores the line cycle number of the line cycle for processing a parent lot and the parent lot number in the first table while being linked together when the parent lot is input to the production line and stores the line cycle number of the line cycle that has processed the child lot and the child lot number while being linked together when a process in the production line is completed and the child lot is output from the production line; and a line cycle management unit that acquires line cycle numbers corresponding to line cycles processing the groups of parts and stores the line cycle numbers, line codes specifying the production lines in which the line cycles corresponding to the line cycle numbers are operated, and start dates of the operations of the line cycles at which the operations of the line cycles are started in a line cycle table while being linked together when the groups of the parts are input to the production lines.

2. The parts production management system according to claim 1, wherein the a line cycle management unit further stores an end date of the line cycle at which the line cycle ends and the line cycle number of the line cycle while being linked together when line cycle completion information is input, and that detects the line cycle in which a start date of the line cycle is stored and an end date of the line cycle is not stored as a currently operating line cycle and outputs the line cycle number of the line cycle to the lot linking unit when the lot linking unit links the parent lot to the child lot.

3. The parts production management system according to claim 2, further comprising:

a third table in which a line code representing the production line, an input port location code representing a location of an input port side of the production line, and an output location code representing a location of an output port side of the production line are stored while being linked together; and a production line detecting unit that reads out the line code of the production line corresponding to the input port location code from the third table.

4. The parts production management system according to claim 1, wherein the lot linking unit reads out the parent lot number corresponding to the line cycle number from the first table, reads out a part number corresponding to the parent lot number as an input part number from a fourth table defining a linking relationship among the lot number, a trolley code representing a trolley loading a lot corresponding to the lot number, and the part number of the lot, refers to a part linking table defining linking between the input part number and a loading part number that is assigned after the input part having the input part number is processed in the production line, reads out a loading part number corresponding to the input part number, links the loading part number with the trolley code of the trolley loading the parts, and stores the loading part number, a location code representing the current location of the trolley, the lot number of the part, and the number of currently loaded parts representing the number of currently loaded input parts in a trolley current status table.

5. The parts production management system according to claim 4, wherein, when the lot linking unit links the line cycle number and the child lot, the lot linking unit reads out the number of currently loaded parts corresponding to the loading trolley code from the trolley current status table when the number of loaded parts is input, acquires the child lot number set in correspondence with the line code when the lot linking unit detects that the number of currently loaded parts is "0", and newly stores the child lot number in the trolley current status table while being linked with the loading trolley code, and the lot linking unit reads out a loaded part number corresponding to the loading trolley code from the trolley current status table when the lot linking unit detects that the number of currently loaded parts is not "0", compares the loaded part number with the loading part number, updates the number of currently loaded parts in the trolley current status table when the loaded part number and the loading part number are identical, and outputs an error notification when the loaded part number and the loading part number are not identical.

6. The parts production management system according to claim 4, wherein the line cycle management unit acquires a part number, newly input to the production line, corresponding to the trolley code from the trolley current status table and detects whether a line cycle corresponding to the line code of the production line is operated, acquires a new line cycle number and sets the new line cycle number as the line cycle number to be linked when the line cycle management unit detects that there is no line cycle corresponding to the part number, reads out the parent lot number corresponding to the line cycle number from the first table, reads out the part number corresponding to the lot number from the fourth table, and compares the part number with the part number read from the trolley current table, sets the line cycle number as the line cycle number to be linked when the part number are identical and reads out the number of types of parts corresponding to the location code from the third table when the part numbers are not identical, and sets the line cycle number as the line cycle number to be linked when the number of types of input parts is not greater than the number of input part numbers, acquires a new line cycle number, and sets the new line cycle number as the line cycle number to be linked when the number of types of input parts is identical to the number of input part numbers.

7. A method of managing parts production in a parts production management system that sets a linking relationship between a parent lot number at an input port of a part producing production line and a child lot number at an output port of the production line, the method comprising:

storing a line cycle number of a line cycle processing a parent lot and the parent lot number while being linked with each other by using a lot linking unit in a first table in which a line cycle number representing the line cycle for processing a group of parts and the parent lot number input for being processed in the line cycle represented by the line cycle number are stored while being linked with each other, when a parent lot is input;

storing the line cycle number of the line cycle that has processed a child lot and the child lot number while being linked with each other by using the lot linking unit in a fifth table in which the line cycle number and the child lot number of the part processed in the line cycle represented by the line cycle number, when the child lot is output from the production line after completion of the process; and acquiring the line cycle numbers corresponding to line cycles processing the groups of parts and storing the line cycle numbers, line codes specifying the production lines in which the line cycles corresponding to the line cycle numbers are operated, and start dates of the operations of the line cycles at which the operations of the line cycles are started in a line cycle table while being linked together when the groups of the parts are input to the production lines.

8. The parts production management method according to claim 7, further comprising storing an end date of the line cycle at which the line cycle ends and the line cycle number of the line cycle while being linked together when line cycle completion information is input, and detecting the line cycle in which a start date of the line cycle is stored and an end date of the line cycle is not stored as a currently operating line cycle and outputting the line cycle number of the line cycle to the lot linking unit when the lot linking unit links the parent lot to the child lot.

9. A parts production management system that sets a linking relationship between a parent lot number at an input port of a part producing production line and a child lot number at an output port of the production line, the parts production management system comprising:

a first table in which a line cycle number representing a line cycle for processing a group of parts and a parent lot number of a part input for being processed in the line cycle represented by the line cycle number are stored while being linked together;

a second table in which the line cycle number and a child lot number of the part processed in the line cycle represented by the line cycle number are stored while being linked together; and a lot linking unit that stores the line cycle number of the line cycle for processing a parent lot and the parent lot number in the first table while being linked together when the parent lot is input to the production line and stores the line cycle number of the line cycle that has processed the child lot and the child lot number while being linked together when a process in the production line is completed and the child lot is output from the production line;

a part location change history table in which location codes indicating input and output ports of processing lines, a loaded part number indicating a number of loaded parts, an unloaded part number indicating a number of unloaded parts, and a part number of the parts are stored while being linked with a change history number assigned as a sequential number in order or generation of a process causing change in an inventory number;

an inventory management unit that reads out information corresponding to a latest change history number corresponding to a designated location code from the part location change history table, and displays the information along with the inventory number on a display screen; and a line cycle management unit that calculates a correction amount with respect to the inventory number of subtracting a number of unloaded parts counted by counters provided in the output port from a number of loaded parts counted by counters provided in the input port, and write the correction amount into the part location change history table.

* * * * *